US005784077A

United States Patent [19]

Silverbrook

[11] Patent Number: 5,784,077

[45] Date of Patent: Jul. 21, 1998

[54] DIGITAL PRINTING USING PLURAL COOPERATIVE MODULAR PRINTING DEVICES

[75] Inventor: Kia Silverbrook, Leichhardt, Australia

[73] Assignee: Eastman Kodak Company, Rochester, N.Y.

[21] Appl. No.: 750,437

[22] PCT Filed: Apr. 10, 1996

[86] PCT No.: PCT/US96/04818

§ 371 Date: Dec. 3, 1996

§ 102(e) Date: Dec. 3, 1996

[87] PCT Pub. No.: WO96/32290

PCT Pub. Date: Oct. 17, 1996

[30] Foreign Application Priority Data

Apr. 12, 1995 [AU] Australia ................................ PN 2331
Apr. 12, 1995 [AU] Australia ................................ PN 2332

[51] Int. Cl.[6] .............................. B41J 2/21; G01F 15/24

[52] U.S. Cl. .............................. 347/2; 358/296; 347/43; 346/136

[58] Field of Search .............................. 101/135, 137, 101/2, 193; 346/134, 136; 358/296, 298, 304, 400, 401; 347/2, 43; D19/89

[56] References Cited

U.S. PATENT DOCUMENTS

| | | | |
|---|---|---|---|
| 1,941,001 | 12/1933 | Hansell | 178/96 |
| 3,373,437 | 3/1968 | Sweet et al. | 347/74 |
| 3,416,153 | 12/1968 | Hertz et al. | 347/73 |
| 3,946,398 | 3/1976 | Kyser et al. | 347/70 |
| 4,164,745 | 8/1979 | Cielo et al. | 347/61 |
| 4,166,277 | 8/1979 | Cielo et al. | 347/55 |
| 4,197,797 | 4/1980 | Rayfield et al. | 101/90 |
| 4,275,290 | 6/1981 | Cielo et al. | 347/61 |
| 4,293,865 | 10/1981 | Jinnai et al. | 347/48 |
| 4,490,728 | 12/1984 | Vaught et al. | 347/60 |
| 4,580,158 | 4/1986 | Macheboeuf | 348/587 |
| 4,694,307 | 9/1987 | Toganoh et al. | 347/85 |
| 4,710,780 | 12/1987 | Saito et al. | 347/55 |
| 4,718,040 | 1/1988 | Ayata et al. | 395/109 |
| 4,737,803 | 4/1988 | Fujimura et al. | 347/67 |
| 4,748,458 | 5/1988 | Inoue et al. | 347/67 |
| 4,751,532 | 6/1988 | Fujimura et al. | 347/55 |
| 4,751,533 | 6/1988 | Saito | 347/67 |
| 4,783,681 | 11/1988 | Tanaka et al. | 399/13 |
| 4,914,452 | 4/1990 | Fukawa | 347/214 |
| 5,150,167 | 9/1992 | Gonda et al. | 399/16 |
| 5,198,836 | 3/1993 | Saito et al. | 347/222 |
| 5,371,527 | 12/1994 | Miller et al. | 347/46 |
| 5,486,057 | 1/1996 | Skinner et al. | 400/120.02 |
| 5,568,168 | 10/1996 | Watanabe | 347/43 |
| 5,596,416 | 1/1997 | Barry et al. | 358/296 |
| 5,660,108 | 8/1997 | Pensavecchia | 101/137 |
| 5,696,893 | 12/1997 | Fromhertz et al. | 395/112 |

FOREIGN PATENT DOCUMENTS

| | | | |
|---|---|---|---|
| 0 317 762 A2 | 5/1989 | European Pat. Off. | B41J 15/04 |
| 2 007 162 A | 5/1979 | United Kingdom | B41J 3/04 |

*Primary Examiner*—Peter S. Wong
*Assistant Examiner*—Gregory J. Teatley, Jr.
*Attorney, Agent, or Firm*—Milton S. Sales

[57] ABSTRACT

A modular high volume digital color printing system uses a drop on demand printing mechanism. Each of plural printing modules contains two heads to allow simultaneous printing of both sides of the paper. Bi-level page image memories are provided. The pages to be printed can be altered by changing the contents of the bi-level page memories. The heads are supplied with ink by a gravity feed mechanism from a single ink reservoir for each color. Paper transport into and out of a printing module is achieved by a modular conveyor belt. Blank paper to be printed is supplied on a roll mounted on a frame with wheels to allow it to be simply rolled into or out of the printing module. The paper roll is at floor level, with the paper transport mechanisms being mounted above the roll. The modularity of the system allows all of the sheets in a color publication to be printed and collated simultaneously.

16 Claims, 23 Drawing Sheets

DIGITAL PRINTING USING PLURAL COOPERATIVE MODULAR PRINTING DEVICES

CROSS-REFERENCE TO RELATED APPLICATIONS

Reference is made to my commonly assigned, co-pending U.S. pat. applications: Ser. No. 08/701,021 entitled CMOS PROCESS COMPATIBLE FABRICATION OF PRINT HEADS filed Aug. 21, 1996; Ser. No. 08/733,711 entitled CONSTRUCTION AND MANUFACTURING PROCESS FOR DROP ON DEMAND PRINT HEADS WITH NOZZLE HEATERS filed Oct. 17, 1996; Ser. No. 08/734,822 entitled A MODULAR PRINT HEAD ASSEMBLY filed Oct. 22, 1996; Ser. No. 08/736,537 entitled PRINT HEAD CONSTRUCTIONS FOR REDUCED ELECTROSTATIC INTERACTION BETWEEN PRINTED DROPLETS filed Oct. 24,1996; Ser. No. 08/750,320 entitled NOZZLE DUPLICATION FOR FAULT TOLERANCE IN INTEGRATED PRINTING HEADS and Ser. No. 08/750,312 entitled HIGH CAPACITY COMPRESSED DOCUMENT IMAGE STORAGE FOR DIGITAL COLOR PRINTERS both filed Nov. 26, 1996; Ser. No. 08/753,718 entitled NOZZLE PLACEMENT IN MONOLITHIC DROP-ON-DEMAND PRINT HEADS and Ser. No. 08/750,606 entitled A COLOR VIDEO PRINTER AND A PHOTO CD SYSTEM WITH INTEGRATED PRINTER both filed on Nov. 27, 1996; Ser. No. 08/750,438 entitled A LIQUID INK PRINTING APPARATUS AND SYSTEM, Ser. No. 08/750,599 entitled COINCIDENT DROP SELECTION, DROP SEPARATION PRINTING METHOD AND SYSTEM, Ser. No. 08/750,435 entitled MONOLITHIC PRINT HEAD STRUCTURE AND A MANUFACTURING PROCESS THEREFOR USING ANISOTROPIC WET ETCHING, Ser. No. 08/750,436 entitled POWER SUPPLY CONNECTION FOR MONOLITHIC PRINT HEADS, Ser. No. 08/750,439 entitled A HIGH SPEED DIGITAL FABRIC PRINTER, Ser. No. 08/750,763 entitled A COLOR PHOTOCOPIER USING A DROP ON DEMAND INK JET PRINTING SYSTEM, Ser. No. 08/765,756 entitled PHOTOGRAPH PROCESSING AND COPYING SYSTEMS, Ser. No. 08/750,646 entitled FAX MACHINE WITH CONCURRENT DROP SELECTION AND DROP SEPARATION INK JET PRINTING, Ser. No. 08/759,774 entitled FAULT TOLERANCE IN HIGH VOLUME PRINTING PRESSES, Ser. No. 08/750,429 entitled INTEGRATED DRIVE CIRCUITRY IN DROP ON DEMAND PRINT HEADS, Ser. No. 08/750,433 entitled HEATER POWER COMPENSATION FOR TEMPERATURE IN THERMAL PRINTING SYSTEMS, Ser. No. 08/750,640 entitled HEATER POWER COMPENSATION FOR THERMAL LAG IN THERMAL PRINTING SYSTEMS, Ser. No. 08/750,650 entitled DATA DISTRIBUTION IN MONOLITHIC PRINT HEADS, and Ser. No. 08/750,642 entitled PRESSURIZABLE LIQUID INK CARTRIDGE FOR COINCIDENT FORCES PRINTERS all filed Dec. 3, 1996; Ser. No. 08/750,647 entitled MONOLITHIC PRINTING HEADS AND MANUFACTURING PROCESSES THEREFOR, Ser. No. 08/750,604 entitled INTEGRATED FOUR COLOR PRINT HEADS, Ser. No. 08/750,605 entitled A SELF-ALIGNED CONSTRUCTION AND MANUFACTURING PROCESS FOR MONOLITHIC PRINT HEADS, Ser. No. 08/682,603 entitled A COLOR PLOTTER USING CONCURRENT DROP SELECTION AND DROP SEPARATION INK JET PRINTING TECHNOLOGY, Ser. No. 08/750,603 entitled A NOTEBOOK COMPUTER WITH INTEGRATED CONCURRENT DROP SELECTION AND DROP SEPARATION COLOR PRINTING SYSTEM, Ser. No. 08/765,130 entitled PRINTING MECHANISMS; Ser. No. 08/750,431 entitled BLOCK FAULT TOLERANCE IN INTEGRATED PRINTING HEADS, Ser. No. 08/750,607 entitled FOUR LEVEL INK SET FOR BI-LEVEL COLOR PRINTING, Ser. No. 08/750,430 entitled A NOZZLE CLEARING PROCEDURE FOR LIQUID INK PRINTING, Ser. No. 08/750,600 entitled METHOD AND APPARATUS FOR ACCURATE CONTROL OF TEMPERATURE PULSES IN PRINTING HEADS, Ser. No. 08/750,608 entitled A PORTABLE PRINTER USING A CONCURRENT DROP SELECTION AND DROP SEPARATION PRINTING SYSTEM, and Ser. No. 08/750,602 entitled IMPROVEMENTS IN IMAGE HALFTONING all filed Dec. 4, 1996; Ser. No. 08/765,127 entitled PRINTING METHOD AND APPARATUS EMPLOYING ELECTROSTATIC DROP SEPARATION, Ser. No. 08/750,643 entitled COLOR OFFICE PRINTER WITH A HIGH CAPACITY DIGITAL PAGE IMAGE STORE, and Ser. No. 08/765,035 entitled HEATER POWER COMPENSATION FOR PRINTING LOAD IN THERMAL PRINTING SYSTEMS all filed Dec. 5, 1996; Ser. No. 08/765,036 entitled APPARATUS FOR PRINTING MULTIPLE DROP SIZES AND FABRICATION THEREOF, Ser. No. 08/765,017 entitled HEATER STRUCTURE AND FABRICATION PROCESS FOR MONOLITHIC PRINT HEADS, Ser. No. 08/750,772 entitled DETECTION OF FAULTY ACTUATORS IN PRINTING HEADS, Ser. No. 08/765,037 entitled PAGE IMAGE AND FAULT TOLERANCE CONTROL APPARATUS FOR PRINTING SYSTEMS all filed Dec. 9, 1996; and Ser. No. 08/765,038 entitled CONSTRUCTIONS AND MANUFACTURING PROCESSES FOR THERMALLY ACTIVATED PRINT HEADS filed Dec. 10, 1996.

FIELD OF THE INVENTION

The present invention relates to computer controlled and in particular to digital printing with a plurality of cooperative modular printer devices.

BACKGROUND OF THE INVENTION

At present, most high volume full color printing is performed by web fed and sheet fed offset color presses. These machines print color pages using four printing plates, one for each of the four color components used in process printing; cyan, magenta, yellow, and black (CMYK). While these machines are highly efficient in printing large volumes of color pages, it is difficult, time consuming, and expensive to change the image being printed. When a new image is to be printed, color separations of the image must be created. Then proof sheets are created, to verify the quality and color of the printed image. These are usually created by a photographic process using the color separations created for the printing press. When the proof sheets are approved, four printing plates must be etched with the color separation images. Offset presses are also large and expensive and required extensive technical knowledge to operate effectively. Many technical parameters, such as dot gain, registration, and screen angles must be carefully controlled to obtain acceptable results. If the print run is greater than 10,000 copies, the set-up costs of the press can be effectively amortized over the volume printed. However, the cost and time required to set up a color press mean that only rarely is fewer than 500 copies of a page printed. If fewer than one hundred copies of a page are to be printed, then color copiers are generally used.

There is increasing recognition in the industry of the need for digital color printing presses, which are capable of printing high quality color pages directly from computer data, without requiring photographic and platemaking processes. These are considered to be most cost effective for print runs of between 100 copies and 10,000 copies.

A digital color printing press accepts a digital version of the page from a computer system, and directly prints the color images. Many technologies have been developed to directly print color pages from digital information, but none yet are cost effective for medium or high volume color printing.

One such technology presently on the market is digital laser electrophotographic color printing. However, the throughput and image quality of this system is inadequate for medium volume printing. As the system uses a single scanned laser beam to generate the image, the throughput is inherently limited by the modulation rate, intensity, and scanning rate of the laser. Other electrophotographic based approaches have been developed and marketed with success in some lower throughput regions of the 100 to 10,000 copies range.

While such machines are viable for short run printing, they are not suitable as replacements for offset presses for medium or large run printing. The throughput is substantially lower, and cost per page substantially higher, than offset printing for print runs in excess of a few thousand copies. Although these machines can be used in parallel to increase the overall printing throughput, the cost of these systems is quite high. The capital cost combined with the high cost per page makes parallel systems not cost competitive with traditional offset printing for medium or large print runs.

Thus, there is a widely recognized need for a high speed digitally controlled printing system able to produce high quality images using standard paper and low cost inks, that is able to compete effectively against mechanical technologies for medium and high volume printing.

SUMMARY OF THE INVENTION

My concurrently filed commonly-assigned, co-pending U.S. patent applications Ser. No. 08/750,438 entitled A LIQUID INK PRINTING APPARATUS AND SYSTEM and Ser. No. 08/750,599 entitled COINCIDENT DROP SELECTION, DROP SEPARATION PRINTING METHOD AND SYSTEM describe new methods and apparatus that afford significant improvements toward overcoming the prior art problems discussed above. Those inventions offer important advantages, e.g., in regard to drop size and placement accuracy, as to printing speeds attainable, as to power usage, as to durability and operative thermal stresses encountered and as to other printer performance characteristics, as well as in regard to manufacturability and the characteristics of useful inks. One important purpose of the present invention is to further enhance the structures and methods described in those applications and thereby contribute to the advancement of printing technology.

One object of the present invention is to provide a digital color printing press characterized by a plurality of printing modules being adapted to be cascaded to achieve a higher total printing rate.

Thus, in one aspect, the present invention constitutes a digital printing system comprising a plurality of digital printer modules, each including means for supporting and feeding a print medium from a supply station through a print path and from a print path outlet, means for pronging upon said medium during its movement through said print path, and sheet conveyor means for transporting sheets from said print path outlet along a module transport segment to a module egress, said modules being interconnected in a serial array wherein the module egress of upstream modules are coupled to the print sheet outlet region of the adjacent downstream modules so that a stack of print sheets builds up upon the coupled conveyor means as the stack passes along the transport segments, from the first module to the last module.

One preferred feature of the invention is that the paper supply is a roll on a removable frame that includes wheels mounted on the underside.

Another preferred feature of the invention is that the paper transport between the printing modules is also modular.

Another preferred form of the invention is a digital color printing press comprising:

(a) means for connecting to a raster image processing computer to receive data for producing a plurality of digitally halftoned binary page images;

(b) a plurality of digital page memories for storing such binary page image data;

(c) a plurality of liquid ink printing heads;

(d) a paper transport system which moves a marking medium past said printing heads as the page image is being printed; and (e) an ink reservoir and ink pressure regulation system which maintains ink flow to the said heads.

Another preferred feature of the invention is that the printing heads are fixed at the same height.

Another preferred feature of the invention is that there is a single ink reservoir for each color which supplies all of the said printing heads.

Another preferred embodiment provides at least two printing heads per module adapted to print simultaneously on opposite sides of the print medium, respectively.

BRIEF DESCRIPTION OF THE DRAWINGS

FIG. 1(*b*) shows a cross section of one variety of nozzle tip in accordance with the invention.

FIG. 3(*b*) shows successive meniscus positions during drop selection and separation.

FIG. 3(*c*) shows the temperatures at various points during a drop selection cycle.

FIG. 3(*d*) shows measured surface tension versus temperature curves for various ink additives.

FIG. 3(*e*) shows the power pulses which are applied to the nozzle heater to generate the temperature curves of FIG. 3(*c*)

FIG. 11(*b*) shows the occurrence of a faulty printing module in the printing line of FIG. 11(*a*).

FIG. 11(*c*) shows the operation of the printing line in a fault tolerant manner.

FIG. 12(*b*) shows data transferred 'downstream' from a faulty printing module immediately after detection of the fault.

FIG. 12(*c*) shows data transferred 'upstream' to restore normal operation after a fault has been corrected.

DETAILED DESCRIPTION OF PREFERRED EMBODIMENTS

Figure 1A:
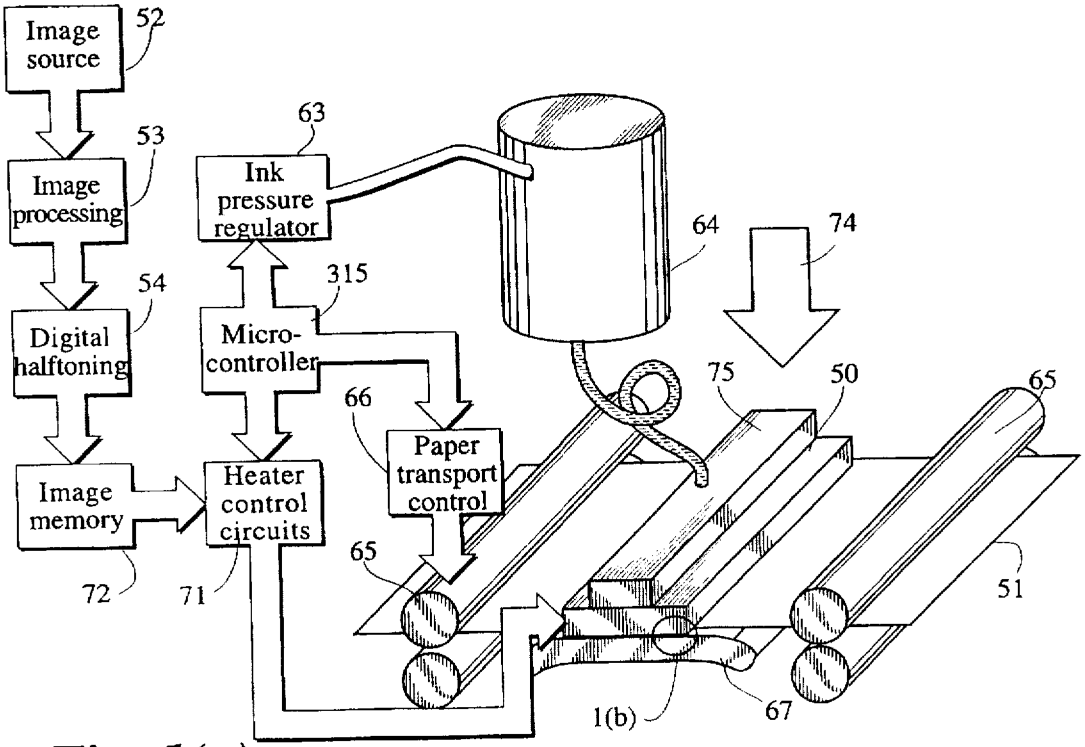
FIG. 1(*a*) shows a simplified block schematic diagram of one exemplary printing apparatus according to the present invention.

In one general aspect, the invention constitutes a drop-on-demand printing mechanism wherein the means of selecting drops to be printed produces a difference in position between selected drops and drops which are not selected, but which is insufficient to cause the ink drops to overcome the ink surface tension and separate from the body of ink, and wherein an alternative means is provided to cause separation of the selected drops from the body of ink.

The separation of drop selection means from drop separation means significantly reduces the energy required to select which ink drops are to be printed. Only the drop selection means must be driven by individual signals to each nozzle. The drop separation means can be a field or condition applied simultaneously to all nozzles.

The drop selection means may be chosen from, but is not limited to, the following list:

1) Electrothermal reduction of surface tension of pressurized ink
2) Electrothermal bubble generation, with insufficient bubble volume to cause drop ejection
3) Piezoelectric, with insufficient volume change to cause drop ejection
4) Electrostatic attraction with one electrode per nozzle The drop separation means may be chosen from, but is not limited to, the following list:

1) Proximity (recording medium in close proximity to print head)
2) Proximity with oscillating ink pressure
3) Electrostatic attraction
4) Magnetic attraction The table "DOD printing technology targets" shows some desirable characteristics of drop on demand printing technology. The table also lists some methods by which some embodiments described herein, or in other of my related applications, provide improvements over the prior art.

DOD printing technology targets

| Target | Method of achieving improvement over prior art |
|---|---|
| High speed operation | Practical, low cost, pagewidth printing heads with more than 10,000 nozzles. Monolithic A4 pagewidth print heads can be manufactured using standard 300 mm (12") silicon wafers |
| High image quality | High resolution (800 dpi is sufficient for most applications), six color process to reduce image noise |
| Full color operation | Halftoned process color at 800 dpi using stochastic screening |
| Ink flexibility | Low operating ink temperature and no requirement for bubble formation |
| Low power requirements | Low power operation results from drop selection means not being required to fully eject drop |
| Low cost | Monolithic print head without aperture plate, high manufacturing yield, small number of electrical connections, use of modified existing CMOS manufacturing facilities |
| High manufacturing yield | Integrated fault tolerance in printing head |
| High reliability | Integrated fault tolerance in printing head. Elimination of cavitation and kogation. Reduction of thermal shock. |
| Small number of electrical connections | Shift registers, control logic, and drive circuitry can be integrated on a monolithic print head using standard CMOS processes |
| Use of existing VLSI manufacturing facilities | CMOS compatibility. This can be achieved because the heater drive power is less is than 1% of Thermal Ink Jet heater drive power |
| Electronic collation | A new page compression system which can achieve 100:1 compression with insignificant image degradation, resulting in a compressed data rate low enough to allow real-time printing of any combination of thousands of pages stored on a low cost magnetic disk drive. |

In thermal ink jet (TIJ) and piezoelectric ink jet systems, a drop velocity of approximately 10 meters per second is preferred to ensure that the selected ink drops overcome ink surface tension, separate from the body of the ink, and strike the recording medium. These systems have a very low efficiency of conversion of electrical energy into drop kinetic energy. The efficiency of TIJ systems is approximately 0.02%). This means that the drive circuits for TIJ print heads must switch high currents. The drive circuits for piezoelectric ink jet heads must either switch high voltages, or drive highly capacitive loads. The total power consumption of pagewidth TIJ printheads is also very high. An 800 dpi A4 full color pagewidth TIJ print head printing a four color black image in one second would consume approximately 6 kW of electrical power, most of which is converted to waste heat. The difficulties of removal of this amount of heat precludes the production of low cost, high speed, high resolution compact pagewidth TIJ systems.

One important feature of embodiments of the invention is a means of significantly reducing the energy required to select which ink drops are to be printed. This is achieved by separating the means for selecting ink drops from the means for ensuring that selected drops separate from the body of ink and form dots on the recording medium. Only the drop selection means must be driven by individual signals to each nozzle. The drop separation means can be a field or condition applied simultaneously to all nozzles.

The table "Drop selection means" shows some of the possible means for selecting drops in accordance with the invention. The drop selection means is only required to create sufficient change in the position of selected drops that the drop separation means can discriminate between selected and unselected drops.

| Drop selection means | | |
|---|---|---|
| Method | Advantage | Limitation |
| 1. Electrothermal reduction of surface tension of pressurized ink | Low temperature increase and low drop selection energy. Can be used with many ink types. Simple fabrication. CMOS drive circuits can be fabricated on same substrate | Requires ink pressure regulating mechanism. Ink surface tension must reduce substantially as temperature increases |
| 2. Electrothermal reduction of ink viscosity, combined with oscillating ink pressure | Medium drop selection energy, suitable for hot melt and oil based inks. Simple fabrication. CMOS drive circuits can be fabricated on same substrate | Requires ink pressure oscillation mechanism. Ink must have a large decrease in viscosity as temperature increases |
| 3. Electrothermal bubble generation, with insufficient bubble volume to cause drop ejection | Well known technology, simple fabrication, bipolar drive circuits can be fabricated on same substrate | High drop selection energy, requires water based ink, problems with kogation, cavitation, thermal stress |
| 4. Piezoelectric, with insufficient volume change to cause drop ejection | Many types of ink base can be used | High manufacturing cost, incompatible with integrated circuit processes, high drive voltage, mechanical complexity, bulky |
| 5. Electrostatic attraction with one electrode per nozzle | Simple electrode fabrication | Nozzle pitch must be relatively large. Crosstalk between adjacent electric fields. Requires high voltage drive circuits |

Other drop selection means may also be used.

The preferred drop selection means for water based inks is method 1: "Electrothermal reduction of surface tension of pressurized ink". This drop selection means provides many advantages over other systems, including; low power operation (approximately 1% of TIJ), compatibility with CMOS VLSI chip fabrication, low voltage operation (approx. 10 V), high nozzle density, low temperature operation, and wide range of suitable ink formulations. The ink must exhibit a reduction in surface tension with increasing temperature.

The preferred drop selection means for hot melt or oil based inks is method 2: "Electrothermal reduction of ink viscosity, combined with oscillating ink pressure". This drop selection means is particularly suited for use with inks which exhibit a large reduction of viscosity with increasing temperature, but only a small reduction in surface tension. This occurs particularly with non-polar ink carriers with relatively high molecular weight. This is especially applicable to hot melt and oil based inks.

The table "Drop separation means" shows some of the possible methods for separating selected drops from the body of ink, and ensuring that the selected drops form dots on the printing medium. The drop separation means discriminates between selected drops and unselected drops to ensure that unselected drops do not form dots on the printing medium.

| Drop separation means | | |
|---|---|---|
| Means | Advantage | Limitation |
| 1. Electrostatic attraction | Can print on rough surfaces, simple implementation | Requires high voltage power supply |

-continued

| Drop separation means | | |
|---|---|---|
| Means | Advantage | Limitation |
| 2. AC electric field | Higher fieldstrength is possible than electrostatic, operating margins can be increased, ink pressure reduced, and dust accumulation is reduced | Requires high voltage AC power supply synchronized to drop ejection phase. Multiple drop phase operation is difficult |
| 3. Proximity (print head in close proximity to, but not touching, recording medium) | Very small spot sizes can be achieved. Very low power dissipation. High drop position accuracy | Requires print medium to be very close to print head surface, not suitable for rough print media, usually requires transfer roller or belt |
| 4. Transfer Proximity (print head is in close proximity to a transfer roller or belt | Very small spot sizes can be achieved, very low power dissipation, high accuracy, can print on rough paper | Not compact due to size of transfer roller or transfer belt. |
| 5. Proximity with oscillating ink pressure | Useful for hot melt inks using viscosity reduction drop selection method, reduces possibility of nozzle clogging, can use pigments instead of dyes | Requires print medium to be very close to print head surface, not suitable for rough print media. Requires ink pressure oscillation apparatus |
| 6. Magnetic attraction | Can print on rough surfaces. Low power if permanent magnets are used | Requires uniform high magnetic field strength, requires magnetic ink |

Other drop separation means may also be used.

The preferred drop separation means depends upon the intended use. For most applications, method 1: "Electrostatic attraction", or method 2: "AC electric field" are most appropriate. For applications where smooth coated paper or film is used, and very high speed is not essential, method 3: "Proximity" may be appropriate. For high speed, high quality systems, method 4: "Transfer proximity" can be used. Method 6: "Magnetic attraction" is appropriate for portable printing systems where the print medium is too rough for proximity printing, and the high voltages required for electrostatic drop separation are undesirable. There is no clear 'best' drop separation means which is applicable to all circumstances.

Further details of various types of printing systems according to the present invention are described in the following Australian patent specifications filed on 12 Apr. 1995, the disclosure of which are hereby incorporated by reference:

'A Liquid ink Fault Tolerant (LIFT) printing mechanism' (Filing no.: PN2308);

'Electrothermal drop selection in LIFT printing' (Filing no.: PN2309);

'Drop separation in LIFT printing by print media proximity' (Filing no.: PN2310);

'Drop size adjustment in Proximity LIFT printing by varying head to media distance' (Filing no.: PN2311);

'Augmenting Proximity LIFT printing with acoustic ink waves' (Filing no.: PN2312);

'Electrostatic drop separation in LIFT printing' (Filing no.: PN2313);

'Multiple simultaneous drop sizes in Proximity LIFT printing' (Filing no.: PN2321);

'Self cooling operation in thermally activated print heads' (Filing no.: PN2322); and 'Thermal Viscosity Reduction LIFT printing' (Filing no.: PN2323).

Figure 1B:
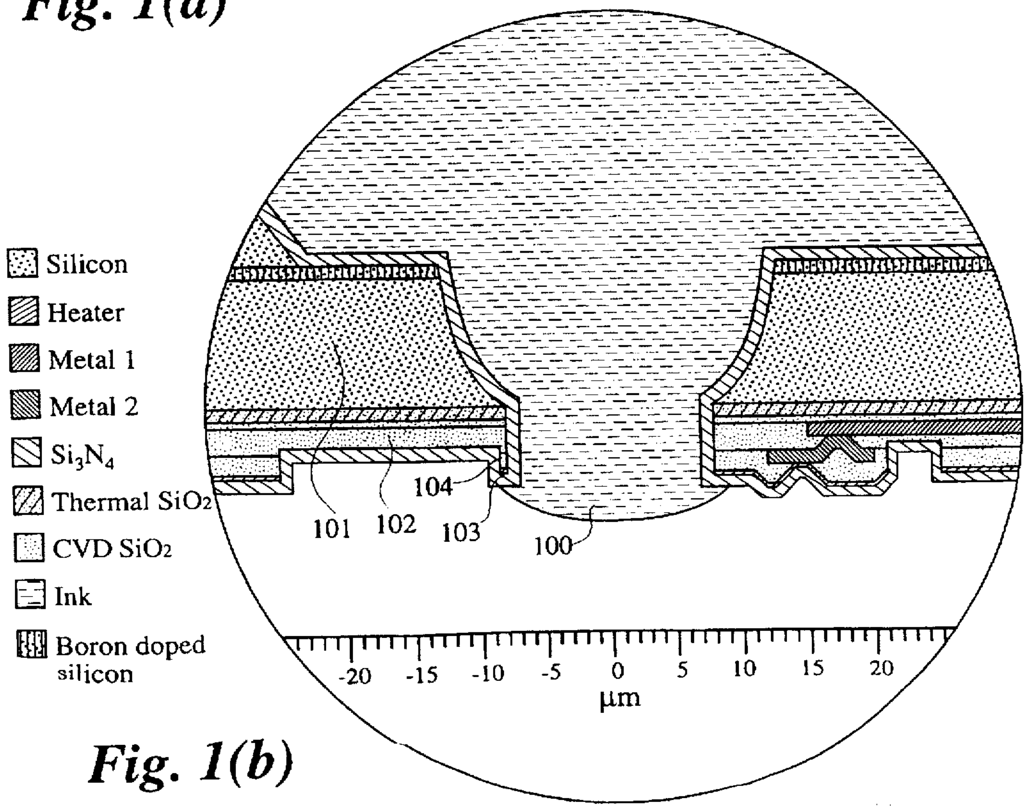
Figure 2A:
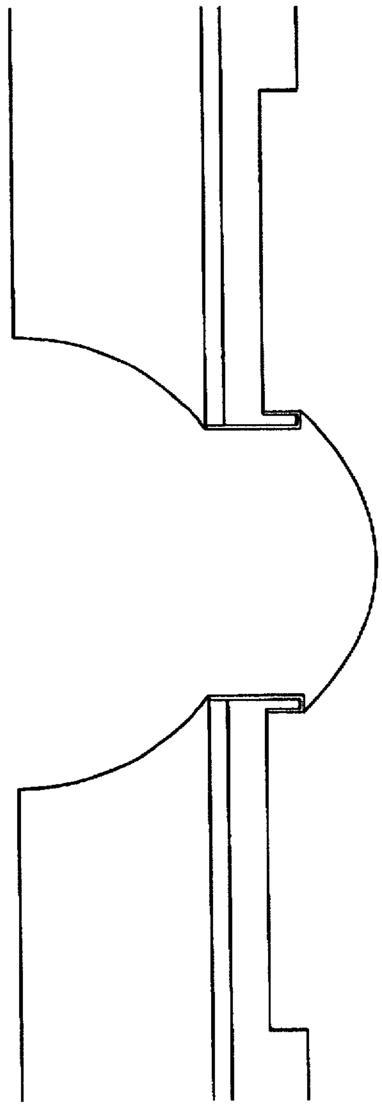
FIGS. 2(*a*) to 2(*f*) show fluid dynamic simulations of drop selection.
Figure 2B:
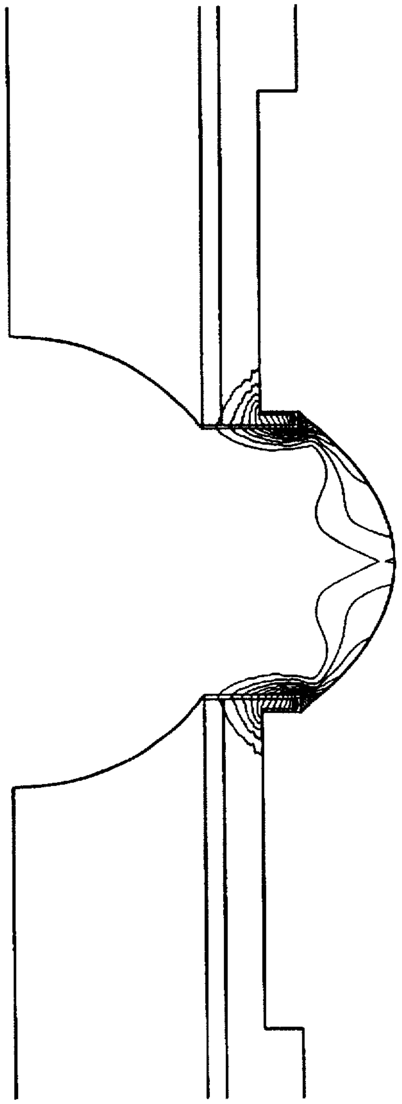
Figure 2C:
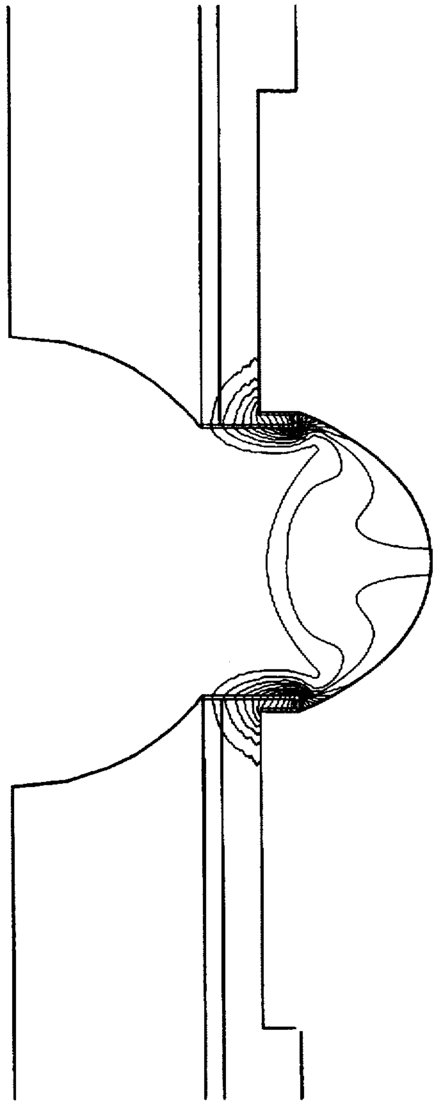
Figure 2D:
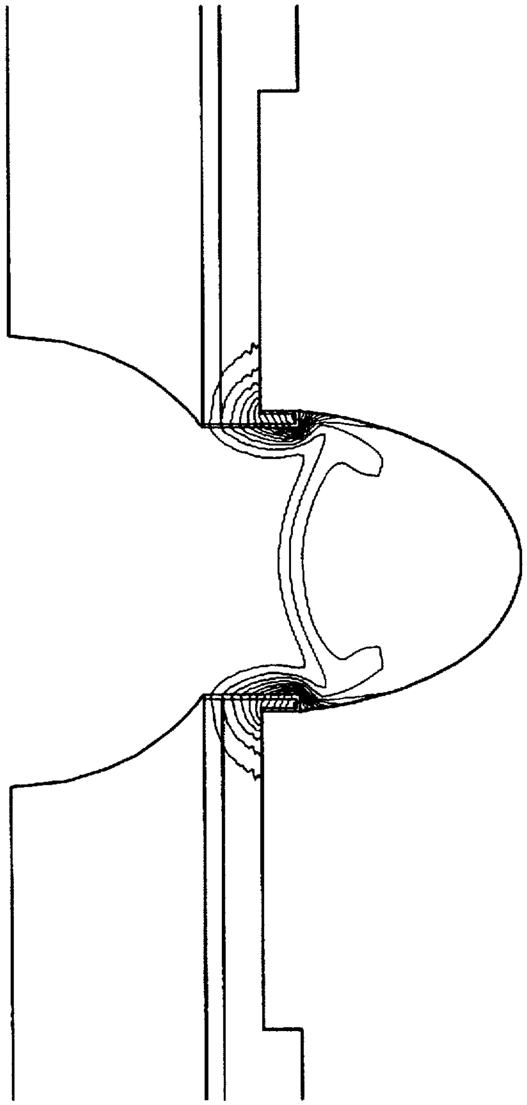
Figure 2E:
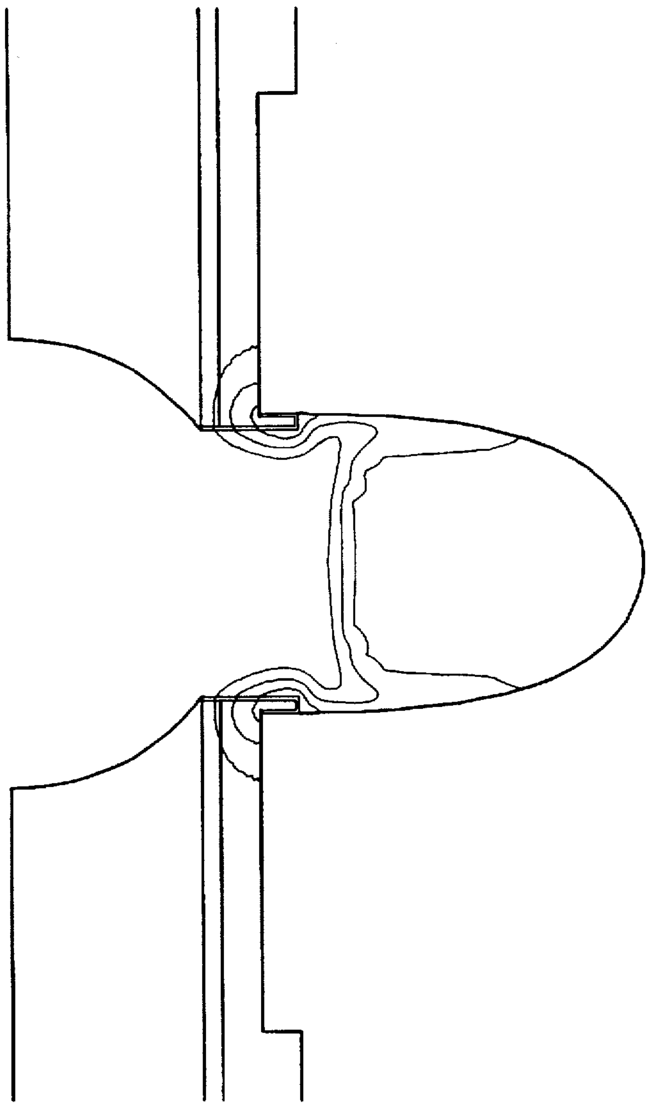
Figure 2F:
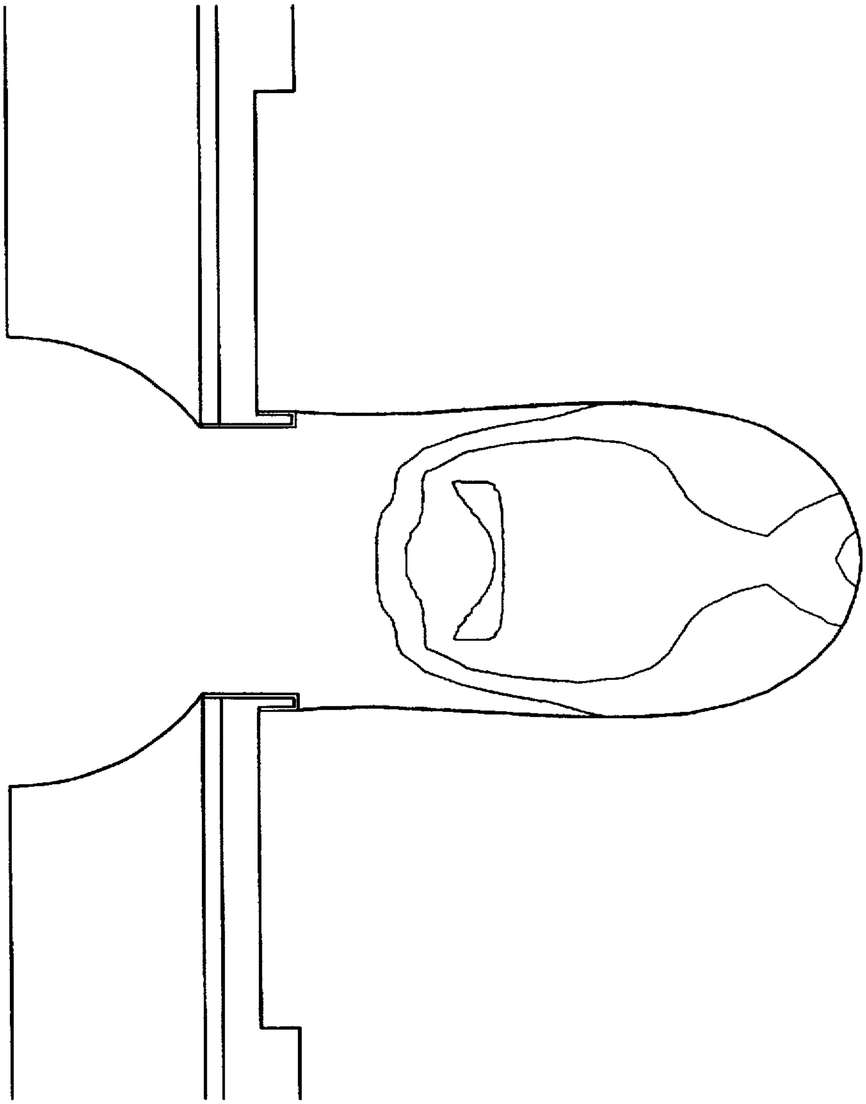
Figure 3A:
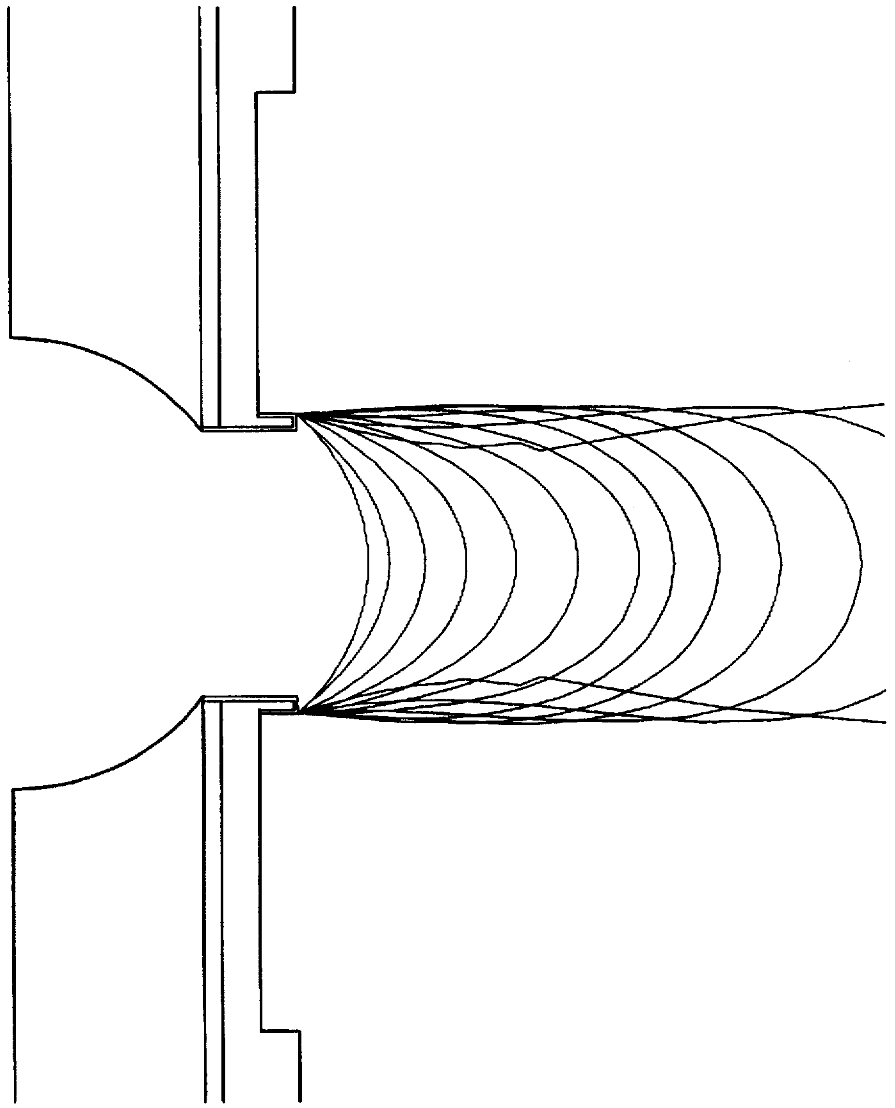
FIG. 3(*a*) shows a finite element fluid dynamic simulation of a nozzle in operation according to an embodiment of the invention.
Figure 3B:
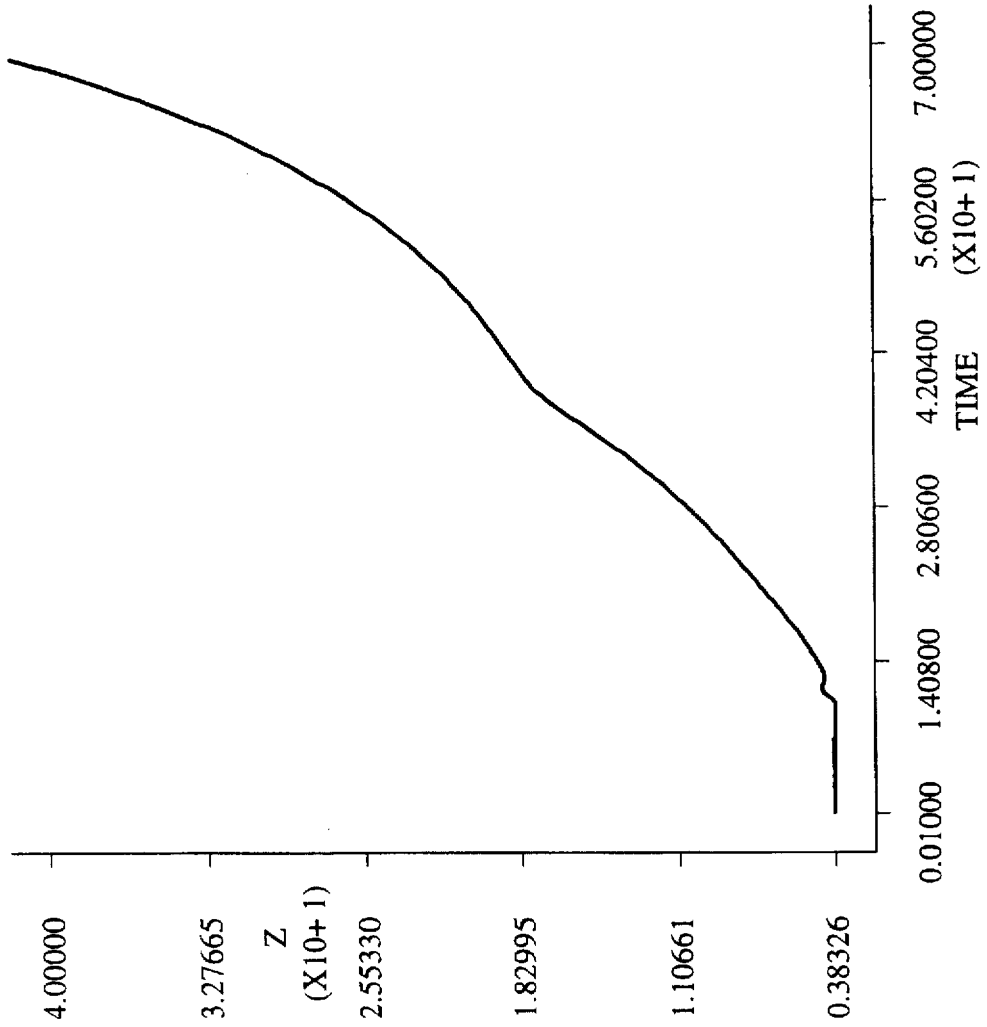
Figure 3C:
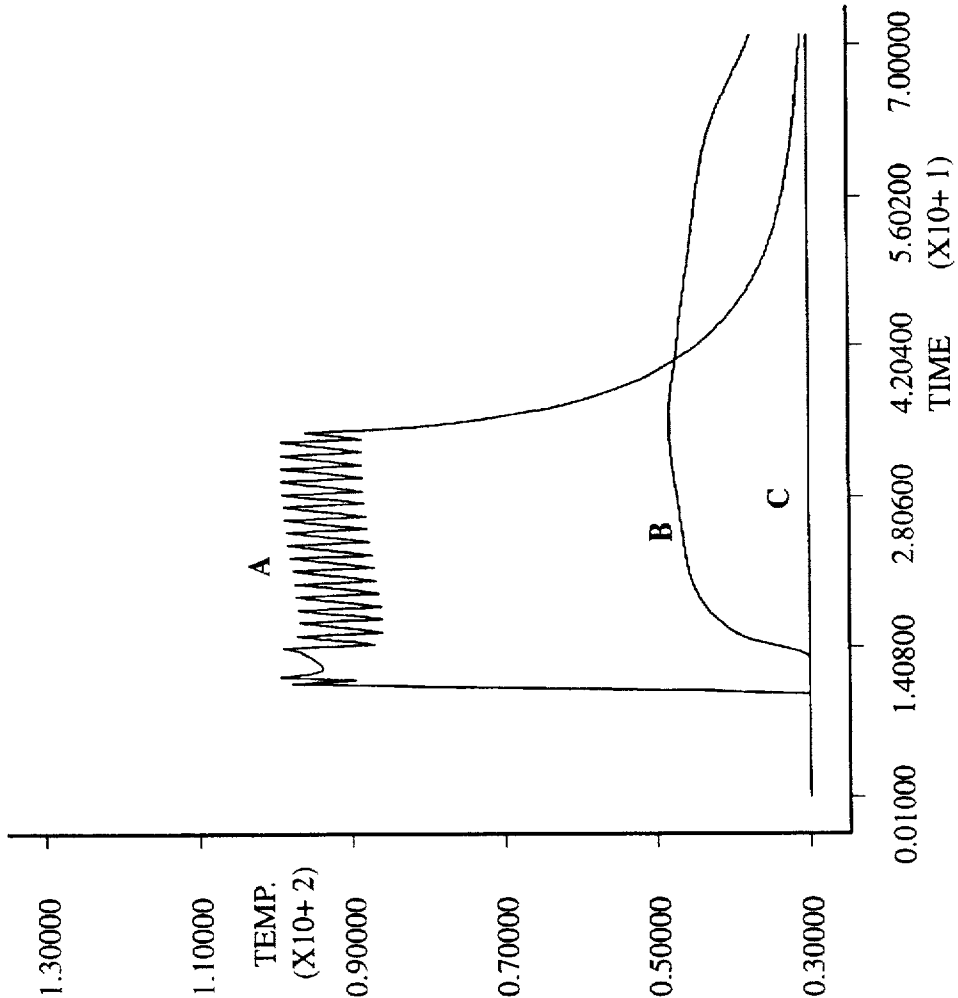
Figure 3D:
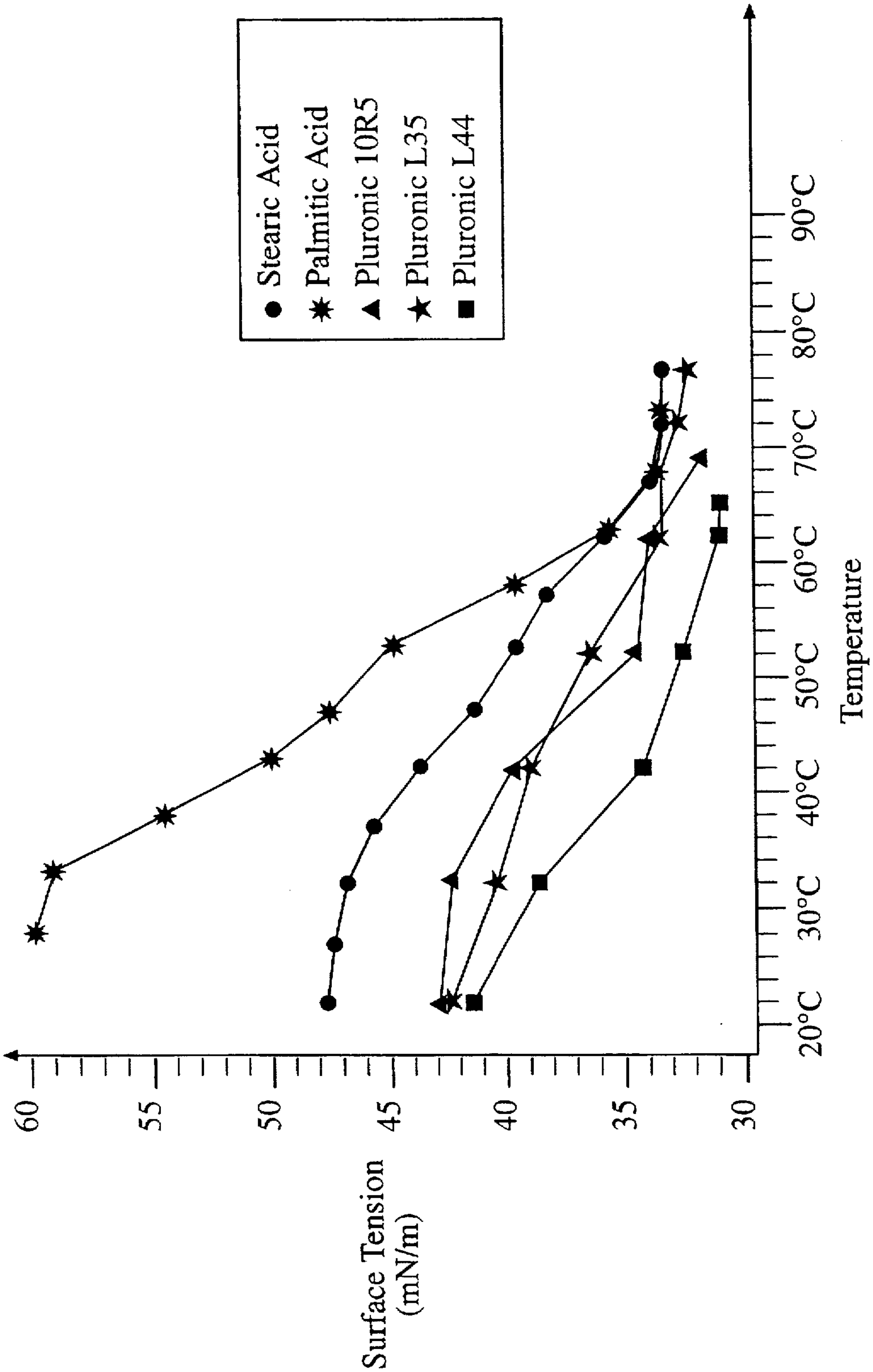
Figure 3E:
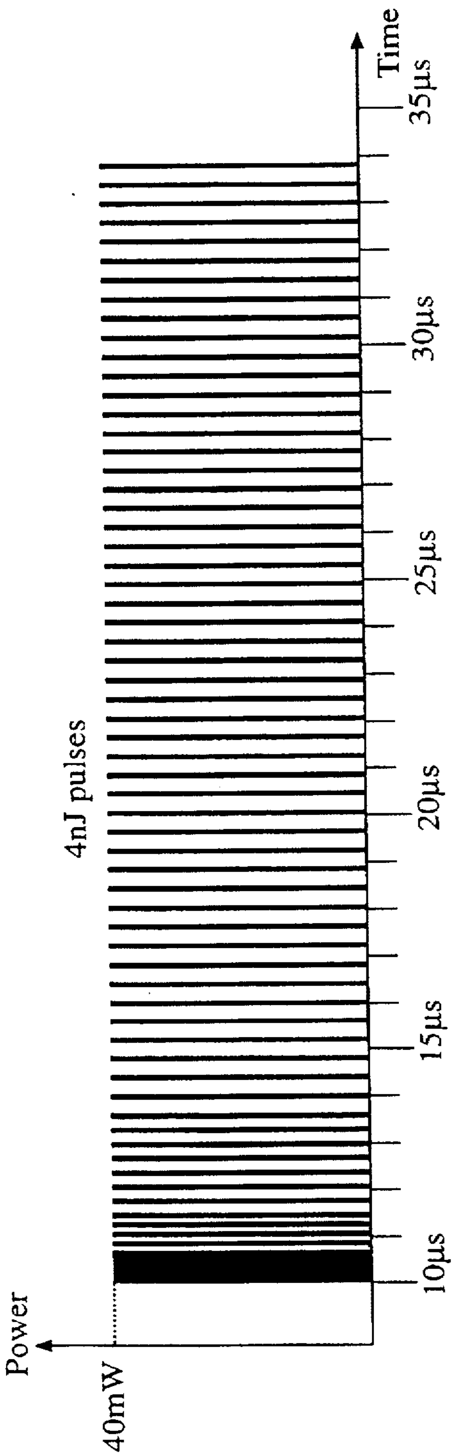

A simplified schematic diagram of one preferred printing system according to the invention appears in FIG. 1 (*a*).

An image source 52 may be raster image data from a scanner or computer, or outline image data in the form of a page description language (PDL), or other forms of digital image representation. This image data is converted to a pixel-mapped page image by the image processing system 53. This may be a raster image processor (RIP) in the case of PDL image data, or may be pixel image manipulation in the case of raster image data. Continuous tone data produced by the image processing unit 53 is halftoned. Halftoning is performed by the Digital Halftoning unit 54. Halftoned bitmap image data is stored in the image memory 72. Depending upon the printer and system configuration, the image memory 72 may be a full page memory, or a band memory. Heater control circuits 71 read data from the image memory 72 and apply time-varying electrical pulses to the nozzle heaters (103 in FIG. 1(*b*)) that are part of the print head 50. These pulses are applied at an appropriate time, and to the appropriate nozzle, so that selected drops will form spots on the recording medium 51 in the appropriate position designated by the data in the image memory 72.

The recording medium 51 is moved relative to the head 50 by a paper transport system 65, which is electronically controlled by a paper transport control system 66, which in turn is controlled by a microcontroller 315. The paper transport system shown in FIG. 1(*a*) is schematic only, and many different mechanical configurations are possible. In the case of pagewidth print heads, it is most convenient to move the recording medium 51 past a stationary head 50. However, in the case of scanning print systems, it is usually most convenient to move the head 50 along one axis (the sub-scanning direction) and the recording medium 51 along the orthogonal axis (the main scanning direction), in a relative raster motion. The microcontroller 315 may also control the ink pressure regulator 63 and the heater control circuits 71.

For printing using surface tension reduction, ink is contained in an ink reservoir 64 under pressure. In the quiescent state (with no ink drop ejected), the ink pressure is insufficient to overcome the ink surface tension and eject a drop. A constant ink pressure can be achieved by applying pressure to the ink reservoir 64 under the control of an ink pressure regulator 63. Alternatively, for larger printing systems, the ink pressure can be very accurately generated and controlled by situating the top surface of the ink in the reservoir 64 an appropriate distance above the head 50. This ink level can be regulated by a simple float valve (not shown).

For printing using viscosity reduction, ink is contained in an ink reservoir 64 under pressure, and the ink pressure is caused to oscillate. The means of producing this oscillation may be a piezoelectric actuator mounted in the ink channels (not shown).

When properly arranged with the drop separation means, selected drops proceed to form spots on the recording medium 51, while unselected drops remain part of the body of ink.

The ink is distributed to the back surface of the head 50 by an ink channel device 75. The ink preferably flows through slots and/or holes etched through the silicon substrate of the head 50 to the front surface, where the nozzles and actuators are situated. In the case of thermal selection, the nozzle actuators are electrothermal heaters.

In some types of printers according to the invention, an external field 74 is required to ensure that the selected drop separates from the body of the ink and moves towards the recording medium 51. A convenient external field 74 is a constant electric field, as the ink is easily made to be electrically conductive. In this case, the paper guide or platen 67 can be made of electrically conductive material and used as one electrode generating the electric field. The other electrode can be the head 50 itself. Another embodiment uses proximity of the print medium as a means of discriminating between selected drops and unselected drops.

For small drop sizes gravitational force on the ink drop is very small; approximately $10^{-4}$ of the surface tension forces, so gravity can be ignored in most cases. This allows the print head 50 and recording medium 51 to be oriented in any direction in relation to the local gravitational field. This is an important requirement for portable printers.

FIG. 1(*b*) is a detail enlargement of a cross section of a single microscopic nozzle tip embodiment of the invention, fabricated using a modified CMOS process. The nozzle is etched in a substrate 101, which may be silicon, glass, metal, or any other suitable material. If substrates which are not semiconductor materials are used, a semiconducting material (such as amorphous silicon) may be deposited on the substrate, and integrated drive transistors and data distribution circuitry may be formed in the surface semiconducting layer. Single crystal silicon (SCS) substrates have several advantages, including:

1) High performance drive transistors and other circuitry can be fabricated in SCS;
2) Print heads can be fabricated in existing facilities (fabs) using standard VLSI processing equipment;
3) SCS has high mechanical strength and rigidity; and
4) SCS has a high thermal conductivity.

In this example, the nozzle is of cylindrical form, with the heater 103 forming an annulus. The nozzle tip 104 is formed from silicon dioxide layers 102 deposited during the fabrication of the CMOS drive circuitry. The nozzle tip is passivated with silicon nitride. The protruding nozzle tip controls the contact point of the pressurized ink 100 on the print head surface. The print head surface is also hydrophobized to prevent accidental spread of ink across the front of the print head.

Many other configurations of nozzles are possible, and nozzle embodiments of the invention may vary in shape, dimensions, and materials used. Monolithic nozzles etched from the substrate upon which the heater and drive electronics are formed have the advantage of not requiring an orifice plate. The elimination of the orifice plate has significant cost savings in manufacture and assembly. Recent methods for eliminating orifice plates include the use of 'vortex' actuators such as those described in Domoto et al U.S. Pat. No. 4,580,158, 1986, assigned to Xerox, and Miller et al U.S. Pat. No. 5,371,527, 1994 assigned to Hewlett-Packard. These, however are complex to actuate, and difficult to fabricate. The preferred method for elimination of orifice plates for print heads of the invention is incorporation of the orifice into the actuator substrate.

This type of nozzle may be used for print heads using various techniques for drop separation.

Operation with Electrostatic Drop Separation

As a first example, operation using thermal reduction of surface tension and electrostatic drop separation is shown in FIG. 2.

FIG. 2 shows the results of energy transport and fluid dynamic simulations performed using FIDAP, a commercial fluid dynamic simulation software package available from Fluid Dynamics Inc., of Illinois, USA. This simulation is of a thermal drop selection nozzle embodiment with a diameter of 8 μm, at an ambient temperature of 30° C. The total energy applied to the heater is 276 nJ, applied as 69 pulses of 4 nJ each. The ink pressure is 10 kPa above ambient air pressure, and the ink viscosity at 30° C. is 1.84 cPs. The ink is water based, and includes a sol of 0.1% palmitic acid to achieve an enhanced decrease in surface tension with increasing temperature. A cross section of the nozzle tip from the central axis of the nozzle to a radial distance of 40 μm is shown. Heat flow in the various materials of the nozzle, including silicon, silicon nitride, amorphous silicon dioxide, crystalline silicon dioxide, and water based ink are simulated using the respective densities, heat capacities, and thermal conductivities of the materials. The time step of the simulation is 0.1 μs.

FIG. 2(*a*) shows a quiescent state, just before the heater is actuated. An equilibrium is created whereby no ink escapes the nozzle in the quiescent state by ensuring that the ink pressure plus external electrostatic field is insufficient to overcome the surface tension of the ink at the ambient temperature. In the quiescent state, the meniscus of the ink does not protrude significantly from the print head surface, so the electrostatic field is not significantly concentrated at the meniscus.

FIG. 2(*b*) shows thermal contours at 5° C. intervals 5 μs after the start of the heater energizing pulse. When the heater is energized, the ink in contact with the nozzle tip is rapidly heated. The reduction in surface tension causes the heated portion of the meniscus to rapidly expand relative to the cool ink meniscus. This drives a convective flow which rapidly transports this heat over part of the free surface of the ink at the nozzle tip. It is necessary for the heat to be distributed over the ink surface, and not just where the ink is in contact with the heater. This is because viscous drag against the solid heater prevents the ink directly in contact with the heater from moving.

FIG. 2(*c*) shows thermal contours at 5° C. intervals 10 μs after the start of the heater energizing pulse. The increase in temperature causes a decrease in surface tension, disturbing the equilibrium of forces. As the entire meniscus has been heated, the ink begins to flow.

FIG. 2(*d*) shows thermal contours at 5° C. intervals 20 μs after the start of the heater energizing pulse. The ink pressure has caused the ink to flow to a new meniscus position, which protrudes from the print head. The electrostatic field becomes concentrated by the protruding conductive ink drop.

FIG. 2(*e*) shows thermal contours at 5° C. intervals 30 μs after the start of the heater energizing pulse, which is also 6 μs after the end of the heater pulse, as the heater pulse duration is 24 μs. The nozzle tip has rapidly cooled due to conduction through the oxide layers, and conduction into the flowing ink. The nozzle tip is effectively 'water cooled' by the ink. Electrostatic attraction causes the ink drop to begin to accelerate towards the recording medium. Were the heater pulse significantly shorter (less than 16 μs in this case) the ink would not accelerate towards the print medium, but would instead return to the nozzle.

FIG. 2(*f*) shows thermal contours at 5° C. intervals 26 μs after the end of the heater pulse. The temperature at the nozzle tip is now less than 5° C. above ambient temperature. This causes an increase in surface tension around the nozzle tip. When the rate at which the ink is drawn from the nozzle exceeds the viscously limited rate of ink flow through the nozzle, the ink in the region of the nozzle tip 'necks', and the selected drop separates from the body of ink. The selected drop then travels to the recording medium under the influence of the external electrostatic field. The meniscus of the ink at the nozzle tip then returns to its quiescent position, ready for the next heat pulse to select the next ink drop. One ink drop is selected, separated and forms a spot on the recording medium for each heat pulse. As the heat pulses are electrically controlled, drop on demand ink jet operation can be achieved.

FIG. 3(*a*) shows successive meniscus positions during the drop selection cycle at 5 μs intervals, starting at the beginning of the heater energizing pulse.

FIG. 3(*b*) is a graph of meniscus position versus time, showing the movement of the point at the centre of the meniscus. The heater pulse starts 10 μs into the simulation.

FIG. 3(*c*) shows the resultant curve of temperature with respect to time at various points in the nozzle. The vertical axis of the graph is temperature, in units of 100° C. The horizontal axis of the graph is time, in units of 10 μs. The temperature curve shown in FIG. 3(*b*) was calculated by FIDAP, using 0.1 μs time steps. The local ambient temperature is 30 degrees C. Temperature histories at three points are shown:

A—Nozzle tip: This shows the temperature history at the circle of contact between the passivation layer, the ink, and air.

B—Meniscus midpoint: This is at a circle on the ink meniscus midway between the nozzle tip and the centre of the meniscus.

C—Chip surface: This is at a point on the print head surface 20 μm from the centre of the nozzle. The temperature only rises a few degrees. This indicates that active circuitry can be located very close to the nozzles without experiencing performance or lifetime degradation due to elevated temperatures.

FIG. 3(*e*) shows the power applied to the heater. Optimum operation requires a sharp rise in temperature at the start of the heater pulse, a maintenance of the temperature a little below the boiling point of the ink for the duration of the pulse, and a rapid fall in temperature at the end of the pulse. To achieve this, the average energy applied to the heater is varied over the duration of the pulse. In this case, the variation is achieved by pulse frequency modulation of 0.1 μs sub-pulses, each with an energy of 4 nJ. The peak power applied to the heater is 40 mW, and the average power over the duration of the heater pulse is 11.5 mW. The sub-pulse frequency in this case is 5 Mhz. This can readily be varied without significantly affecting the operation of the print head. A higher sub-pulse frequency allows finer control over the power applied to the heater. A sub-pulse frequency of 13.5 Mhz is suitable, as this frequency is also suitable for minimizing the effect of radio frequency interference (RFI).

Inks with a negative temperature coefficient of surface tension

The requirement for the surface tension of the ink to decrease with increasing temperature is not a major restriction, as most pure liquids and many mixtures have this property. Exact equations relating surface tension to temperature for arbitrary liquids are not available. However, the following empirical equation derived by Ramsay and Shields is satisfactory for many liquids:

$$\gamma_T = k\frac{(T_c - T - 6)}{\sqrt[3]{\left(\frac{Mx}{\rho}\right)^2}}$$

Where $\gamma_T$ is the surface tension at temperature T, k is a constant, $T_c$ is the critical temperature of the liquid, M is the molar mass of the liquid, x is the degree of association of the liquid, and ρ is the density of the liquid. This equation indicates that the surface tension of most liquids falls to zero as the temperature reaches the critical temperature of the liquid. For most liquids, the critical temperature is substantially above the boiling point at atmospheric pressure, so to achieve an ink with a large change in surface tension with a small change in temperature around a practical ejection temperature, the admixture of surfactants is recommended.

The choice of surfactant is important. For example, water based ink for thermal ink jet printers often contains isopropyl alcohol (2-propanol) to reduce the surface tension and promote rapid drying. Isopropyl alcohol has a boiling point of 82.4° C., lower than that of water. As the temperature rises, the alcohol evaporates faster than the water, decreasing the alcohol concentration and causing an increase in surface tension. A surfactant such as 1-Hexanol (b.p. 158° C.) can be used to reverse this effect, and achieve a surface tension which decreases slightly with temperature. However, a relatively large decrease in surface tension with temperature is desirable to maximize operating latitude. A surface tension decrease of 20 mN/m over a 30° C. temperature range is preferred to achieve large operating margins, while as little as 10 mN/m can be used to achieve operation of the print head according to the present invention.

Inks With Large $-\Delta\gamma_T$

Several methods may be used to achieve a large negative change in surface tension with increasing temperature. Two such methods are:

1) The ink may contain a low concentration sol of a surfactant which is solid at ambient temperatures, but melts at a threshold temperature. Particle sizes less than 1,000 Å are desirable. Suitable surfactant melting points for a water based ink are between 50° C. and 90° C., and preferably between 60° C. and 80° C.
2) The ink may contain an oil/water microemulsion with a phase inversion temperature (PIT) which is above the maximum ambient temperature, but below the boiling point of the ink. For stability, the PIT of the microemulsion is preferably 20° C. or more above the maximum non-operating temperature encountered by the ink. A PIT of approximately 80° C. is suitable.

Inks with Surfactant Sols

Inks can be prepared as a sol of small particles of a surfactant which melts in the desired operating temperature range. Examples of such surfactants include carboxylic acids with between 14 and 30 carbon atoms, such as:

| Name | Formula | m.p. | Synonym |
|---|---|---|---|
| Tetradecanoic acid | $CH_3(CH_2)_{12}COOH$ | 58° C. | Myristic acid |
| Hexadecanoic acid | $CH_3(CH_2)_{14}COOH$ | 63° C. | Palmitic acid |
| Octadecanoic acid | $CH_3(CH_2)_{15}COOH$ | 71° C. | Stearic acid |
| Eicosanoic acid | $CH_3(CH_2)_{16}COOH$ | 77° C. | Arachidic acid |
| Docosanoic acid | $CH_3(CH_2)_{20}COOH$ | 80° C. | Behenic acid |

As the melting point of sols with a small particle size is usually slightly less than of the bulk material, it is preferable to choose a carboxylic acid with a melting point slightly above the desired drop selection temperature. A good example is Arachidic acid.

These carboxylic acids are available in high purity and at low cost. The amount of surfactant required is very small, so the cost of adding them to the ink is insignificant. A mixture of carboxylic acids with slightly varying chain lengths can be used to spread the melting points over a range of temperatures. Such mixtures will typically cost less than the pure acid.

It is not necessary to restrict the choice of surfactant to simple unbranched carboxylic acids. Surfactants with branched chains or phenyl groups, or other hydrophobic moieties can be used. It is also not necessary to use a carboxylic acid. Many highly polar moieties are suitable for the hydrophilic end of the surfactant. It is desirable that the polar end be ionizable in water, so that the surface of the surfactant particles can be charged to aid dispersion and prevent flocculation. In the case of carboxylic acids, this can be achieved by adding an alkali such as sodium hydroxide or potassium hydroxide.

Preparation of Inks with Surfactant Sols

The surfactant sol can be prepared separately at high concentration, and added to the ink in the required concentration.

An example process for creating the surfactant sol is as follows:

1) Add the carboxylic acid to purified water in an oxygen free atmosphere.
2) Heat the mixture to above the melting point of the carboxylic acid. The water can be brought to a boil.
3) Ultrasonicate the mixture, until the typical size of the carboxylic acid droplets is between 100 Å and 1,000 Å.
4) Allow the mixture to cool.
5) Decant the larger particles from the top of the mixture.
6) Add an alkali such as NaOH to ionize the carboxylic acid molecules on the surface of the particles. A pH of approximately 8 is suitable. This step is not absolutely necessary, but helps stabilize the sol.
7) Centrifuge the sol. As the density of the carboxylic acid is lower than water, smaller particles will accumulate at the outside of the centrifuge, and larger particles in the centre.
8) Filter the sol using a microporous filter to eliminate any particles above 5000 Å.
9) Add the surfactant sol to the ink preparation. The sol is required only in very dilute concentration.

The ink preparation will also contain either dye(s) or pigment(s), bactericidal agents, agents to enhance the electrical conductivity of the ink if electrostatic drop separation is used, humectants, and other agents as required.

Anti-foaming agents will generally not be required, as there is no bubble formation during the drop ejection process.

Cationic surfactant sols

Inks made with anionic surfactant sols are generally unsuitable for use with cationic dyes or pigments. This is because the cationic dye or pigment may precipitate or flocculate with the anionic surfactant. To allow the use of cationic dyes and pigments, a cationic surfactant sol is required. The family of alkylamines is suitable for this purpose.

Various suitable alkylamines are shown in the following table:

| Name | Formula | Synonym |
|---|---|---|
| Hexadecylamine | $CH_3(CH_2)_{14}CH_2NH_2$ | Palmityl amine |
| Octadecylamine | $CH_3(CH_2)_{16}CH_2NH_2$ | Stearyl amine |
| Eicosylamine | $CH_3(CH_2)_{18}CH_2NH_2$ | Arachidyl amine |
| Docosylamine | $CH_3(CH_2)_{20}CH_2NH_2$ | Behenyl amine |

The method of preparation of cationic surfactant sols is essentially similar to that of anionic surfactant sols, except that an acid instead of an alkali is used to adjust the pH balance and increase the charge on the surfactant particles. A pH of 6 using HCl is suitable.

Microemulsion Based Inks

An alternative means of achieving a large reduction in surface tension as some temperature threshold is to base the ink on a microemulsion. A microemulsion is chosen with a phase inversion temperature (PIT) around the desired ejection threshold temperature. Below the PIT, the microemulsion is oil in water (O/W), and above the PIT the microemulsion is water in oil (W/O). At low temperatures, the surfactant forming the microemulsion prefers a high curvature surface around oil, and at temperatures significantly above the PIT, the surfactant prefers a high curvature surface around water. At temperatures close to the PIT, the microemulsion forms a continuous 'sponge' of topologically connected water and oil.

There are two mechanisms whereby this reduces the surface tension. Around the PIT, the surfactant prefers surfaces with very low curvature. As a result, surfactant molecules migrate to the ink/air interface, which has a curvature which is much less than the curvature of the oil emulsion. This lowers the surface tension of the water. Above the phase inversion temperature, the microemulsion changes from O/W to W/O, and therefore the ink/air interface changes from water/air to oil/air. The oil/air interface has a lower surface tension.

There is a wide range of possibilities for the preparation of microemulsion based inks.

For fast drop ejection, it is preferable to chose a low viscosity oil.

In many instances, water is a suitable polar solvent. However, in some cases different polar solvents may be required. In these cases, polar solvents with a high surface tension should be chosen, so that a large decrease in surface tension is achievable.

The surfactant can be chosen to result in a phase inversion temperature in the desired range. For example, surfactants of the group poly(oxyethylene)alkylphenyl ether (ethoxylated alkyl phenols, general formula: $C_nH_{2n+1}C_4H_6(CH_2CH_2O)_mOH$) can be used. The hydrophilicity of the surfactant can be increased by increasing m, and the hydrophobicity can be increased by increasing n. Values of m of approximately 10, and n of approximately 8 are suitable.

Low cost commercial preparations are the result of a polymerization of various molar ratios of ethylene oxide and alkyl phenols, and the exact number of oxyethylene groups varies around the chosen mean. These commercial preparations are adequate, and highly pure surfactants with a specific number of oxyethylene groups are not required.

The formula for this surfactant is $C_8H_{17}C_4H_6(CH_2CH_2O)_nOH$ (average n=10).

Synonyms include Octoxynol-10, PEG-10 octyl phenyl ether and POE (10) octyl phenyl ether The HLB is 13.6, the melting point is 7° C., and the cloud point is 65° C.

Commercial preparations of this surfactant are available under various brand names. Suppliers and brand names are listed in the following table:

| Trade name | Supplier |
|---|---|
| Akyporox OP 100 | Chem-Y GmbH |
| Alkasurf OP-10 | Rhone-Poulenc Surfactants and Specialties |
| Dehydrophen POP 10 | Pulcra SA |
| Hyonic OP-10 | Henkel Corp. |
| Iconol OP-10 | BASF Corp. |
| Igepal O | Rhone-Poulenc France |
| Macol OP-10 | PPG Industries |
| Malorphen 810 | Huls AG |
| Nikkol OP-10 | Nikko Chem. Co. Ltd. |
| Renex 750 | ICI Americas Inc. |
| Rexol 45/10 | Hart Chemical Ltd. |

-continued

| Trade name | Supplier |
|---|---|
| Synperonic OP10 | ICI PLC |
| Teric X10 | ICI Australia |

These are available in large volumes at low cost (less than one dollar per pound in quantity), and so contribute less than 10 cents per liter to prepared microemulsion ink with a 5% surfactant concentration.

Other suitable ethoxylated alkyl phenols include those listed in the following table:

| Trivial name | Formula | HLB | Cloud point |
|---|---|---|---|
| Nonoxynol-9 | $C_9H_{19}C_4H_6(CH_2CH_2O)_{-9}OH$ | 13 | 54° C. |
| Nonoxynol-10 | $C_9H_{19}C_4H_6(CH_2CH_2O)_{-10}OH$ | 13.2 | 62° C. |
| Nonoxynol-11 | $C_9H_{19}C_4H_6(CH_2CH_2O)_{-11}OH$ | 13.8 | 72° C. |
| Nonoxynol-12 | $C_9H_{19}C_4H_6(CH_2CH_2O)_{-12}OH$ | 14.5 | 81° C. |
| Octoxynol-9 | $C_8H_{17}C_4H_6(CH_2CH_2O)_{-9}OH$ | 12.1 | 61° C. |
| Octoxynol-10 | $C_8H_{17}C_4H_6(CH_2CH_2O)_{-10}OH$ | 13.6 | 65° C. |
| Octoxynol-12 | $C_8H_{17}C_4H_6(CH_2CH_2O)_{-12}OH$ | 14.6 | 88° C. |
| Dodoxynol-10 | $C_{12}H_{25}C_4H_6(CH_2CH_2O)_{-10}OH$ | 12.6 | 42° C. |
| Dodoxynol-11 | $C_{12}H_{25}C_4H_6(CH_2CH_2O)_{-11}OH$ | 13.5 | 56° C. |
| Dodoxynol-14 | $C_{12}H_{25}C_4H_6(CH_2CH_2O)_{-14}OH$ | 14.5 | 87° C. |

Microemulsion based inks have advantages other than surface tension control:

1) Microemulsions are thermodynamically stable, and will not separate. Therefore, the storage time can be very long. This is especially significant for office and portable printers, which may be used sporadically.
2) The microemulsion will form spontaneously with a particular drop size, and does not require extensive stirring, centrifuging, or filtering to ensure a particular range of emulsified oil drop sizes.
3) The amount of oil contained in the ink can be quite high, so dyes which are soluble in oil or soluble in water, or both, can be used. It is also possible to use a mixture of dyes, one soluble in water, and the other soluble in oil, to obtain specific colors.
4) Oil miscible pigments are prevented from flocculating, as they are trapped in the oil microdroplets.
5) The use of a microemulsion can reduce the mixing of different dye colors on the surface of the print medium.
6) The viscosity of microemulsions is very low.
7) The requirement for humectants can be reduced or eliminated.

Dyes and pigments in microemulsion based inks

Oil in water mixtures can have high oil contents—as high as 40%—and still form O/W microemulsions. This allows a high dye or pigment loading.

Mixtures of dyes and pigments can be used. An example of a microemulsion based ink mixture with both dye and pigment is as follows:

1) 70% water
2) 5% water soluble dye
3) 5% surfactant
4) 10% oil
5) 10% oil miscible pigment The following table shows the nine basic combinations of colorants in the oil and water phases of the microemulsion that may be used.

| Combination | Colorant in water phase | Colorant in oil phase |
|---|---|---|
| 1 | none | oil miscible pigment |
| 2 | none | oil soluble dye |
| 3 | water soluble dye | none |
| 4 | water soluble dye | oil miscible pigment |
| 5 | water soluble dye | oil soluble dye |
| 6 | pigment dispersed in water | none |
| 7 | pigment dispersed in water | oil miscible pigment |
| 8 | pigment dispersed in water | oil soluble dye |
| 9 | none | none |

The ninth combination, with no colorants, is useful for printing transparent coatings, UV ink, and selective gloss highlights.

As many dyes are amphiphilic, large quantities of dyes can also be solubilized in the oil-water boundary layer as this layer has a very large surface area.

It is also possible to have multiple dyes or pigments in each phase, and to have a mixture of dyes and pigments in each phase.

When using multiple dyes or pigments the absorption spectrum of the resultant ink will be the weighted average of the absorption spectra of the different colorants used. This presents two problems:

1) The absorption spectrum will tend to become broader, as the absorption peaks of both colorants are averaged. This has a tendency to 'muddy' the colors. To obtain brilliant color, careful choice of dyes and pigments based on their absorption spectra, not just their human-perceptible color, needs to be made.
2) The color of the ink may be different on different substrates. If a dye and a pigment are used in combination, the color of the dye will tend to have a smaller contribution to the printed ink color on more absorptive papers, as the dye will be absorbed into the paper, while the pigment will tend to 'sit on top' of the paper. This may be used as an advantage in some circumstances.

Surfactants with a Krafft point in the drop selection temperature range

For ionic surfactants there is a temperature (the Krafft point) below which the solubility is quite low, and the solution contains essentially no micelles.

Above the Krafft temperature micelle formation becomes possible and there is a rapid increase in solubility of the surfactant. If the critical micelle concentration (CMC) exceeds the solubility of a surfactant at a particular temperature, then the minimum surface tension will be achieved at the point of maximum solubility, rather than at the CMC. Surfactants arc usually much less effective below the Krafft point.

This factor can be used to achieve an increased reduction in surface tension with increasing temperature. At ambient temperatures, only a portion of the surfactant is in solution. When the nozzle heater is turned on, the temperature rises, and more of the surfactant goes into solution, decreasing the surface tension.

A surfactant should be chosen with a Krafft point which is near the top of the range of temperatures to which the ink is raised. This gives a maximum margin between the concentration of surfactant in solution at ambient temperatures, and the concentration of surfactant in solution at the drop selection temperature.

The concentration of surfactant should be approximately equal to the CMC at the Krafft point. In this manner, the surface tension is reduced to the maximum amount at elevated temperatures, and is reduced to a minimum amount at ambient temperatures.

The following table shows some commercially available surfactants with Krafft points in the desired range.

| Formula | Krafft point |
|---|---|
| $C_{16}H_{33}SO_3Na^+$ | 57° C. |
| $C_{18}H_{37}SO_3Na^+$ | 70° C. |
| $C_{16}H_{33}SO_4Na^+$ | 45° C. |
| $Na^{+-}O_4S(CH_2)_{16}SO_4^{-NA+}$ | 44.9° C. |
| $K^{+-}O_4S(CH_2)_{16}SO_4^-K^+$ | 55° C. |
| $C_{16}H_{33}CH(CH_3)C_4H_6SO_3^-Na^+$ | 60.8° C. |

Surfactants with a cloud point in the drop selection temperature range

Non-ionic surfactants using polyoxyethylene (POE) chains can be used to create an ink where the surface tension falls with increasing temperature. At low temperatures, the POE chain is hydrophilic, and maintains the surfactant in solution. As the temperature increases, the structured water around the POE section of the molecule is disrupted, and the POE section becomes hydrophobic. The surfactant is increasingly rejected by the water at higher temperatures, resulting in increasing concentration of surfactant at the air/ink interface, thereby lowering surface tension. The temperature at which the POE section of a nonionic surfactant becomes hydrophilic is related to the cloud point of that surfactant. POE chains by themselves are not particularly suitable, as the cloud point is generally above 100° C.

Polyoxypropylene (POP) can be combined with POE in POE/POP block copolymers to lower the cloud point of POE chains without introducing a strong hydrophobicity at low temperatures.

Two main configurations of symmetrical POE/POP block copolymers are available. These are:

1) Surfactants with POE segments at the ends of the molecules, and a POP segment in the centre, such as the poloxamer class of surfactants (generically CAS 9003-11-6)
2) Surfactants with POP segments at the ends of the molecules, and a POE segment in the centre, such as the meroxapol class of surfactants (generically also CAS 9003-11-6)

Some commercially available varieties of poloxamer and meroxapol with a high surface tension at room temperature, combined with a cloud point above 40° C. and below 100° C. are shown in the following table:

| Trivial name | BASF Trade name | Formula | Surface Tension (mN/m) | Cloud point |
|---|---|---|---|---|
| Meroxapol 105 | Pluronic 10R5 | $HO(CHCH_3CH_2O)_{-7}$—$(CH_2CH_2O)_{-22}$—$(CHCH_3CH_2O)_{-7}OH$ | 50.9 | 69° C. |
| Meroxapol 108 | Pluronic 10R8 | $HO(CHCH_3CH_2O)_{-7}$—$(CH_2CH_2O)_{-91}$—$(CHCH_3CH_2O)_{-7}OH$ | 54.1 | 99° C. |
| Meroxapol 178 | Pluronic 17R8 | $HO(CHCH_3CH_2O)_{-12}$—$(CH_2CH_2O)_{-136}$—$(CHCH_3CH_2O)_{-12}OH$ | 47.3 | 81° C. |
| Meroxapol 258 | Pluronic 25R8 | $HO(CHCH_3CH_2O)_{-18}$—$(CH_2CH_2O)_{-163}$—$(CHCH_3CH_2O)_{-18}OH$ | 46.1 | 80° C. |
| Poloxamer 105 | Pluronic L35 | $HO(CH_2CH_2O)_{-11}$—$(CHCH_3CH_2O)_{-16}$—$(CH_2CH_2O)_{-11}OH$ | 48.8 | 77° C. |
| Poloxamer 124 | Pluronic L44 | $HO(CH_2CH_2O)_{-11}$—$(CHCH_3CH_2O)_{-21}$—$(CH_2CH_2O)_{-11}OH$ | 45.3 | 65° C. |

Other varieties of poloxamer and meroxapol can readily be synthesized using well known techniques. Desirable characteristics are a room temperature surface tension which is as high as possible, and a cloud point between 40° C. and 100° C., and preferably between 60° C. and 80° C.

Meroxapol [$HO(CHCH_3CH_2O)_x(CH_2CH_2O)_y(CHCH_3CH_2O)_zOH$] varieties where the average x and z are approximately 4, and the average y is approximately 15 may be suitable.

If salts are used to increase the electrical conductivity of the ink, then the effect of this salt on the cloud point of the surfactant should be considered.

The cloud point of POE surfactants is increased by ions that disrupt water structure (such as $I^-$), as this makes more water molecules available to form hydrogen bonds with the POE oxygen lone pairs. The cloud point of POE surfactants is decreased by ions that form water structure (such as $Cl^-$, $OH^-$), as fewer water molecules are available to form hydrogen bonds. Bromide ions have relatively little effect. The ink composition can be 'tuned' for a desired temperature range by altering the lengths of POE and POP chains in a block copolymer surfactant, and by changing the choice of salts (e.g $Cl^-$to Br to $I^-$) that are added to increase electrical conductivity. NaCl is likely to be the best choice of salts to in crease ink conductivity, due to low cost and non-toxicity. NaCl slightly lower s the cloud point of nonionic surfactants.

Hot Melt Inks

The ink need not be in a liquid state at room temperature. Solid 'hot melt' irks can be used by heating the printing head and ink reservoir above the melting point of the ink . The hot melt ink must be formulated so that the surface tension of the molten ink decreases with temperature. A decrease of approximately 2 mN/pr will be typical of many such preparations using waxes and other substances. However, a reduction in surface tension of approximately 20 mN/rn is desirable in order to achieve good operating margins when relying on a reduction in surface tension rather than a reduction in viscosity.

The temperature difference between quiescent temperature and drop selection temperature may be greater for a hot melt ink than for a water based ink, as water based inks are constrained by the boiling point of the water.

The ink must be liquid at the quiescent temperature. The quiescent temperature should be higher than the highest ambient temperature likely to be encountered by the printed page. The quiescent temperature should also be as low as practical, to reduce the power needed to heat the print head, and to provide a maximum margin between the quiescent and the drop ejection temperatures. A quiescent temperature between 60° C. and 90° C. is generally suitable, though other temperatures may be used. A drop ejection temperature of between 160° C. and 200° C. is generally suitable.

There are several methods of achieving an enhanced reduction in surface tension with increasing temperature.

1) A dispersion of microfine particles of a surfactant with a melting point substantially above the quiescent temperature, but substantially below the drop ejection temperature, can be added to the hot melt ink while in the liquid phase.
2) A polar/non-polar microemulsion with a PIT which is preferably at least 20° C. above the melting points of both the polar and non-polar compounds.

To achieve a large reduction in surface tension with temperature, it is desirable that the hot melt ink carrier have a relatively large surface tension (above 30 mN/m) when at the quiescent temperature. This generally excludes alkanes such as waxes. Suitable materials will generally have a strong intermolecular attraction, which may be achieved by multiple hydrogen bonds, for example, polyols, such as Hexanetetrol, which has a melting point of 88° C.

Surface tension reduction of various solutions

FIG. 3(*d*) shows the measured effect of temperature on the surface tension of various aqueous preparations containing the following additives:

1) 0.1% sol of Stearic Acid
2) 0.1% sol of Palmitic acid
3) 0.1% solution of Pluronic 10R5 (trade mark of BASF)
4) 0.1% solution of Pluronic L35 (trade mark of BASF)
5) 0.1% solution of Pluronic L44 (trade mark of BASF)

Inks suitable for printing systems of the present invention are described in the following Australian patent specifications, the disclosure of which are hereby incorporated by reference:

'Ink composition based on a microemulsion' (Filing no.: PN5223, filed on 6 Sep. 1995);

'Ink composition containing surfactant sol' (Filing no.: PN5224, filed on 6 Sep. 1995);

'Ink composition for DOD printers with Krafft point near the drop selection temperature sol' (Filing no.: PN6240, filed on 30 Oct. 1995); and 'Dye and pigment in a microemulsion based ink' (Filing no.: PN6241, filed on 30 Oct. 1995).

Operation Using Reduction of Viscosity

Reference is again made to FIGS. 1(*a*) and 1(*b*). As a second example, operation of an embodiment using thermal reduction of viscosity and proximity drop separation, in combination with hot melt ink, is as follows. Prior to operation of the printer, solid ink is melted in the reservoir 64. The reservoir, ink passage to the print head, ink channels 75, and print head 50 are maintained at a temperature at which the ink 100 is liquid, but exhibits a relatively high viscosity (for example, approximately 100 cP). The Ink 100 is retained in the nozzle by the surface tension of the ink. The ink 100 is formulated so that the viscosity of the ink reduces with increasing temperature. The ink pressure oscillates at a frequency which is an integral multiple of the drop ejection frequency from the nozzle. The ink pressure oscillation causes oscillations of the ink meniscus at the nozzle tips, but this oscillation is small due to the high ink viscosity. At the normal operating temperature, these oscillations are of insufficient amplitude to result in drop separation. When the heater 103 is energized, the ink forming the selected drop is heated, causing a reduction in viscosity to a value which is preferably less than 5 cP. The reduced viscosity results in the ink meniscus moving further during the high pressure part of the ink pressure cycle. The recording medium 51 is arranged sufficiently close to the print head 50 so that the selected drops contact the recording medium 51, but sufficiently far away that the unselected drops do not contact the recording medium 51. Upon contact with the recording medium 51, part of the selected drop freezes, and attaches to the recording medium. As the ink pressure falls, ink begins to move back into the nozzle. The body of ink separates from the ink which is frozen onto the recording medium. The meniscus of the ink 100 at the nozzle tip then returns to low amplitude oscillation. The viscosity of the ink increases to its quiescent level as remaining heat is dissipated to the bulk ink and print head. One ink drop is selected, separated and forms a spot on the recording medium 51 for each heat pulse. As the heat pulses are electrically controlled, drop on demand ink jet operation can be achieved.

Manufacturing of Print Heads

Manufacturing processes for monolithic print heads in accordance with the present invention are described in the following Australian patent specifications filed on 12 Apr. 1995, the disclosure of which are hereby incorporated by reference:

'A monolithic LIFT printing head' (Filing no.: PN2301);

'A manufacturing process for monolithic LIFT printing heads' (Filing no.: PN2302);

'A self-aligned heater design for LIFT print heads' (Filing no.: PN2303);

'Integrated four color LIFT print heads' (Filing no.: PN2304);

'Power requirement reduction in monolithic LIFT printing heads' (Filing no.: PN2305);

'A manufacturing process for monolithic LIFT print heads using anisotropic wet etching' (Filing no.: PN2306);

'Nozzle placement in monolithic drop-on-demand print heads' (Filing no.: PN2307);

'Heater structure for monolithic LIFT print heads' (Filing no.: PN2346);

'Power supply connection for monolithic LIFT print heads' (Filing no.: PN2347);

'External connections for Proximity LIFT print heads' (Filing no.: PN2348); and

'A self-aligned manufacturing process for monolithic LIFT print heads' (Filing no.: PN2349); and 'CMOS process compatible fabrication of LIFT print heads' (Filing no.: PN5222, 6 Sep. 1995).

'A manufacturing process for LIFT print heads with nozzle rim heaters' (Filing no.: PN6238, 30 Oct. 1995);

'A modular LIFT print head' (Filing no.: PN6237, 30 Oct. 1995);

'Method of increasing packing density of printing nozzles' (Filing no.: PN6236, 30 Oct. 1995); and 'Nozzle dispersion for reduced electrostatic interaction between simultaneously printed droplets' (Filing no.: PN6239, 30 Oct. 1995).

Control of Print Heads

Means of providing page image data and controlling heater temperature in print heads of the present invention is described in the following Australian patent specifications filed on 12 Apr. 1995, the disclosure of which are hereby incorporated by reference:

'Integrated drive circuitry in LIFT print heads' (Filing no.: PN2295);

'A nozzle clearing procedure for Liquid Ink Fault Tolerant (LIFT) printing' (Filing no.: PN2294);

'Heater power compensation for temperature in LIFT printing systems' (Filing no.: PN2314);

'Heater power compensation for thermal lag in LIFT printing systems' (Filing no.: PN2315);

'Heater power compensation for print density in LIFT printing systems' (Filing no.: PN2316);

'Accurate control of temperature pulses in printing heads' (Filing no.: PN2317);

'Data distribution in monolithic LIFT print heads' (Filing no.: PN2318);

'Page image and fault tolerance routing device for LIFT printing systems' (Filing no.: PN2319); and 'A removable pressurized liquid ink cartridge for LIFT printers' (Filing no.: PN2320).

Image Processing for Print Heads

An objective of printing systems according to the invention is to attain a print quality which is equal to that which people are accustomed to in quality color publications printed using offset printing. This can be achieved using a print resolution of approximately 1,600 dpi. However, 1,600 dpi printing is difficult and expensive to achieve. Similar results can be achieved using 800 dpi printing, with 2 bits per pixel for cyan and magenta, and one bit per pixel for yellow and black. This color model is herein called CC'MM'YK. Where high quality monochrome image printing is also required, two bits per pixel can also be used for black. This color model is herein called CC'MM'YKK'. Color models, halftoning, data compression, and real-time expansion systems suitable for use in systems of this invention and other printing systems are described in the following Australian patent specifications filed on 12 Apr. 1995, the disclosure of which are hereby incorporated by reference:

'Four level ink set for bi-level color printing' (Filing no.: PN2339);

'Compression system for page images' (Filing no.: PN2340);

'Real-time expansion apparatus for compressed page images' (Filing no.: PN2341); and 'High capacity compressed document image storage for digital color printers' (Filing no.: PN2342);

'Improving JPEG compression in the presence of text' (Filing no.: PN2343);

'An expansion and halftoning device for compressed page images' (Filing no.: PN2344); and 'Improvements in image halftoning' (Filing no.: PN2345).

Applications Using Print Heads According to this Invention

Printing apparatus and methods of this invention are suitable for a wide range of applications, including (but not limited to) the following: color and monochrome office printing, short run digital printing, high speed digital printing, process color printing, spot color printing, offset press supplemental printing, low cost printers using scanning print heads, high speed printers using pagewidth print heads, portable color and monochrome printers, color and monochrome copiers, color and monochrome facsimile machines, combined printer, facsimile and copying machines, label printing, large format plotters, photographic duplication, printers for digital photographic processing, portable printers incorporated into digital 'instant' cameras, video printing, printing of PhotoCD images, portable printers for 'Personal Digital Assistants', wallpaper printing, indoor sign printing, billboard printing, and fabric printing.

Printing systems based on this invention are described in the following Australian patent specifications filed on 12 Apr. 1995, the disclosure of which are hereby incorporated by reference:

'A high speed color office printer with a high capacity digital page image store' (Filing no.: PN2329);

'A short run digital color printer with a high capacity digital page image store' (Filing no.: PN2330);

'A digital color printing press using LIFT printing technology' (Filing no.: PN2331);

'A modular digital printing press' (Filing no.: PN2332);

'A high speed digital fabric printer' (Filing no.: PN2333);

'A color photograph copying system' (Filing no.: PN2334);

'A high speed color photocopier using a LIFT printing system' (Filing no.: PN2335);

'A portable color photocopier using LEFT printing technology' (Filing no.: PN2336);

'A photograph processing system using LIFT printing technology' (Filing no.: PN2337);

'A plain paper facsimile machine using a LIFT printing system' (Filing no.: PN2338);

'A PhotoCD system with integrated printer' (Filing no.: PN2293);

'A color plotter using LIFT printing technology' (Filing no.: PN2291);

'A notebook computer with integrated LIFT color printing system' (Filing no.: PN2292);

'A portable printer using a LIFT printing system' (Filing no.: PN2300);

'Fax machine with on-line database interrogation and customized magazine printing' (Filing no.: PN2299);

'Miniature portable color printer' (Filing no.: PN2298);

'A color video printer using a LIFT printing system' (Filing no.: PN2296); and

'An integrated printer, copier, scanner, and facsimile using a LIFT printing system' (Filing no.: PN2297)

Compensation of Print Heads for Environmental Conditions

It is desirable that drop on demand printing systems have consistent and predictable ink drop size and position. Unwanted variation in ink drop size and position causes variations in the optical density of the resultant print, reducing the perceived print quality. These variations should be kept to a small proportion of the nominal ink drop volume and pixel spacing respectively. Many environmental variables can be compensated to reduce their effect to insignificant levels. Active compensation of some factors can be achieved by varying the power applied to the nozzle heaters.

An optimum temperature profile for one print head embodiment involves an instantaneous raising of the active region of the nozzle tip to the ejection temperature, maintenance of this region at the ejection temperature for the duration of the pulse, and instantaneous cooling of the region to the ambient temperature.

This optimum is not achievable due to the stored heat capacities and thermal conductivities of the various materials used in the fabrication of the nozzles in accordance with the invention. However, improved performance can be achieved by shaping the power pulse using curves which can be derived by iterative refinement of finite element simulation of the print head. The power applied to the heater can be varied in time by various techniques, including, but not limited to:

1) Varying the voltage applied to the heater
2) Modulating the width of a series of short pulses (PWM)
3) Modulating the frequency of a series of short pulses (PFM)

To obtain accurate results, a transient fluid dynamic simulation with free surface modeling is required, as convection in the ink, and ink flow, significantly affect on the temperature achieved with a specific power curve.

By the incorporation of appropriate digital circuitry on the print head substrate, it is practical to individually control the power applied to each nozzle. One way to achieve this is by 'broadcasting' a variety of different digital pulse trains across the print head chip, and selecting the appropriate pulse train for each nozzle using multiplexing circuits.

An example of the environmental factors which may be compensated for is listed in the table "Compensation for environmental factors". This table identifies which environmental factors are best compensated globally (for the entire print head), per chip (for each chip in a composite multi-chip print head), and per nozzle.

Compensation for environmental factors

| Factor compensated | Scope | Sensing or user control method | Compensation mechanism |
|---|---|---|---|
| Ambient Temperature | Global | Temperature sensor mounted on print head | Power supply voltage or global PFM patterns |
| Power supply voltage fluctuation with number of active nozzles | Global | Predictive active nozzle count based on print data | Power supply voltage or global PFM patterns |
| Local heat build-up with successive nozzle actuation | Per nozzle | Predictive active nozzle count based on print data | Selection of appropriate PFM pattern for each printed drop |
| Drop size control for multiple bits per pixel | Per nozzle | Image data | Selection of appropriate PFM pattern for each printed drop |
| Nozzle geometry variations between wafers | Per chip | Factory measurement, datafile supplied with print head | Global PFM patterns per print head chip |
| Heater resistivity variations between wafers | Per chip | Factory measurement, datafile supplied with print head | Global PFM patterns print head chip |
| User image intensity adjustment | Global | User selection | Power supply voltage, electrostatic acceleration voltage, or ink pressure |
| Ink surface tension reduction method and threshold temperature | Global | Ink cartridge sensor or user selection | Global PFM patterns |
| Ink viscosity | Global | Ink cartridge sensor or user selection | Global PFM patterns and/or clock rate |
| Ink dye or pigment concentration | Global | Ink cartridge sensor or user selection | Global PFM patterns |
| Ink response time | Global | Ink cartridge sensor or user selection | Global PFM patterns |

Most applications will not require compensation for all of these variables. Some variables have a minor effect, and compensation is only necessary where very high image quality is required.

Print head drive circuits

Figure 4:
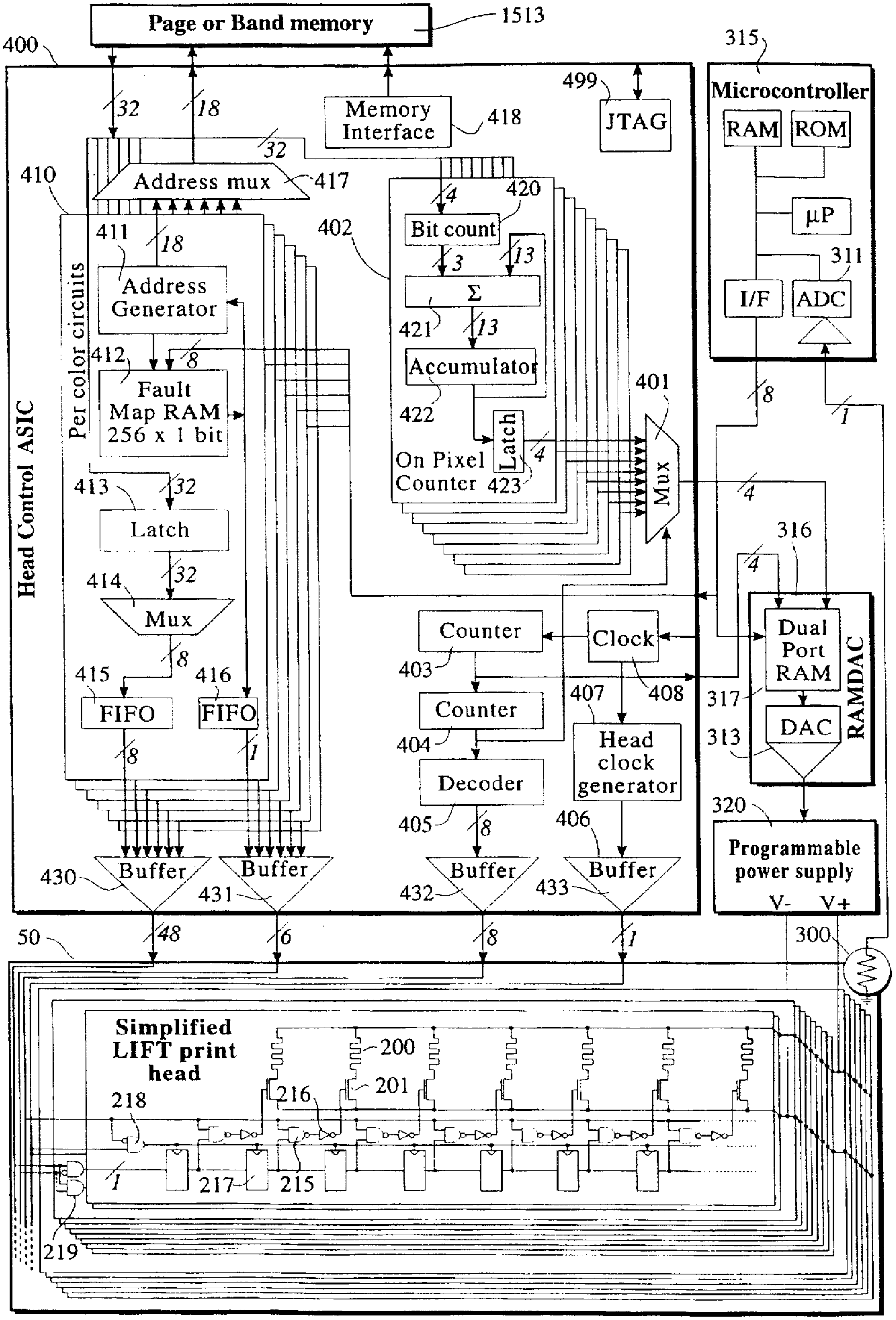
FIG. 4 shows a block schematic diagram of print head drive circuitry for practice of the invention.

FIG. 4 is a block schematic diagram showing electronic operation of an example head driver circuit in accordance with this invention. This control circuit uses analog modulation of the power supply voltage applied to the print head to achieve heater power modulation, and does not have individual control of the power applied to each nozzle. FIG. 4 shows a block diagram for a system using an 800 dpi pagewidth print head which prints process color using the CC'MM'YK color model. The print head 50 has a total of 79,488 nozzles, with 39,744 main nozzles and 39,744 redundant nozzles. The main and redundant nozzles are divided into six colors, and each color is divided into 8 drive phases. Each drive phase has a shift register which converts the serial data from a head control ASIC 400 into parallel data for enabling heater drive circuits. There is a total of 96 shift registers, each providing data for 828 nozzles. Each shift register is composed of 828 shift register stages 217, the outputs of which are logically anded with phase enable signal by a nand gate 215. The output of the nand gate 215 drives an inverting buffer 216, which in turn controls the drive transistor 201. The drive transistor 201 actuates the electrothermal heater 200, which may be a heater 103 as shown in FIG. 1(*b*). To maintain the shifted data valid during the enable pulse, the clock to the shift register is stopped the enable pulse is active by a clock stopper 218, which is shown as a single gate for clarity, but is preferably any of a range of well known glitch free clock control circuits. Stopping the clock of the shift register removes the requirement for a parallel data latch in the print head, but adds some complexity to the control circuits in the Head Control ASIC 400. Data is routed to either the main nozzles or the redundant nozzles by the data router 219 depending on the state of the appropriate signal of the fault status bus.

The print head shown in FIG. 4 is simplified, and does not show various means of improving manufacturing yield, such as block fault tolerance. Drive circuits for different configurations of print head can readily be derived from the apparatus disclosed herein.

Digital information representing patterns of dots to be printed on the recording medium is stored in the Page or Band memory 1513, which may be the same as the Image memory 72 in FIG. 1 (*a*). Data in 32 bit words representing dots of one color is read from the Page or Band memory 1513 using addresses selected by the address mux 417 and control signals generated by the Memory Interface 418. These addresses are generated by Address generators 411, which forms part of the 'Per color circuits' 410, for which there is one for each of the six color components. The addresses are generated based on the positions of the nozzles in relation to the print medium. As the relative position of the nozzles may be different for different print heads, the Address generators 411 are preferably made programmable. The Address generators 411 normally generate the address corresponding to the position of the main nozzles. However, when faulty nozzles are present, locations of blocks of nozzles containing faults can be marked in the Fault Map RAM 412. The Fault Map RAM 412 is read as the page is printed. If the memory indicates a fault in the block of nozzles, the address is altered so that the Address generators 411 generate the address corresponding to the position of the redundant nozzles. Data read from the Page or Band memory 1513 is latched by the latch 413 and converted to four sequential bytes by the multiplexer 414. Timing of these bytes is adjusted to match that of data representing other colors by the FIFO 415. This data is then buffered by the buffer 430 to form the 48 bit main data bus to the print head 50. The data is buffered as the print head may be located a relatively long distance from the head control ASIC. Data from the Fault Map RAM 412 also forms the input to the FIFO 416. The timing of this data is matched to the data output of the FIFO 415, and buffered by the buffer 431 to form the fault status bus.

The programmable power supply 320 provides power for the head 50. The voltage of the power supply 320 is controlled by the DAC 313, which is part of a RAM and DAC combination (RAMDAC) 316. The RAMDAC 316 contains a dual port RAM 317. The contents of the dual port RAM 317 are programmed by the Microcontroller 315. Temperature is compensated by changing the contents of the dual port RAM 317. These values are calculated by the microcontroller 315 based on temperature sensed by a thermal sensor 300. The thermal sensor 300 signal connects to the Analog to Digital Converter (ADC) 311. The ADC 311 is preferably incorporated in the Microcontroller 315.

The Head Control ASIC 400 contains control circuits for thermal lag compensation and print density. Thermal lag compensation requires that the power supply voltage to the head 50 is a rapidly time-varying voltage which is synchronized with the enable pulse for the heater. This is achieved by programming the programmable power supply 320 to produce this voltage. An analog time varying programming voltage is produced by the DAC 313 based upon data read from the dual port RAM 317. The data is read according to an address produced by the counter 403. The counter 403 produces one complete cycle of addresses during the period of one enable pulse. This synchronization is ensured, as the counter 403 is clocked by the system clock 408, and the top count of the counter 403 is used to clock the enable counter 404. The count from the enable counter 404 is then decoded by the decoder 405 and buffered by the buffer 432 to produce the enable pulses for the head 50. The counter 403 may include a prescaler if the number of states in the count is less than the number of clock periods in one enable pulse. Sixteen voltage states are adequate to accurately compensate for the heater thermal lag. These sixteen states can be specified by using a four bit connection between the counter 403 and the dual port RAM 317. However, these sixteen states may not be linearly spaced in time. To allow non-linear timing of these states the counter 403 may also include a ROM or other device which causes the counter 403 to count in a non-linear fashion. Alternatively, fewer than sixteen states may be used.

For print density compensation, the printing density is detected by counting the number of pixels to which a drop is to be printed ('on' pixels) in each enable period. The 'on' pixels are counted by the On pixel counters 402. There is one On pixel counter 402 for each of the eight enable phases. The number of enable phases in a print head in accordance with the invention depend upon the specific design. Four, eight, and sixteen are convenient numbers, though there is no requirement that the number of enable phases is a power of two. The On Pixel Counters 402 can be composed of combinatorial logic pixel counters 420 which determine how many bits in a nibble of data are on. This number is then accumulated by the adder 421 and accumulator 422. A latch 423 holds the accumulated value valid for the duration of the enable pulse. The multiplexer 401 selects the output of the latch 423 which corresponds to the current enable phase, as determined by the enable counter 404. The output of the multiplexer 401 forms part of the address of the dual port RAM 317. An exact count of the number of 'on' pixels is not necessary, and the most significant four bits of this count are adequate.

Combining the four bits of thermal lag compensation address and the four bits of print density compensation address means that the dual port RAM 317 has an 8 bit address. This means that the dual port RAM 317 contains 256 numbers, which are in a two dimensional array. These two dimensions are time (for thermal lag compensation) and print density. A third dimension—temperature—can be included. As the ambient temperature of the head varies only slowly, the microcontroller 315 has sufficient time to calculate a matrix of 256 numbers compensating for thermal lag and print density at the current temperature. Periodically (for example, a few times a second), the microcontroller senses the current head temperature and calculates this matrix.

The clock to the print head 50 is generated from the system clock 408 by the Head clock generator 407, and buffered by the buffer 406. To facilitate testing of the Head control ASIC, JTAG test circuits 499 may be included.

Comparison with thermal ink jet technology

The table "Comparison between Thermal ink jet and Present Invention" compares the aspects of printing in accordance with the present invention with thermal ink jet printing technology.

A direct comparison is made between the present invention and thermal ink jet technology because both are drop on demand systems which operate using thermal actuators and liquid ink. Although they may appear similar, the two technologies operate on different principles.

Thermal ink jet printers use the following fundamental operating principle. A thermal impulse caused by electrical resistance heating results in the explosive formation of a bubble in liquid ink. Rapid and consistent bubble formation can be achieved by superheating the ink, so that sufficient heat is transferred to the ink before bubble nucleation is complete. For water based ink, ink temperatures of approximately 280° C. to 400° C. are required. The bubble formation causes a pressure wave which forces a drop of ink from the aperture with high velocity. The bubble then collapses, drawing ink from the ink reservoir to re-fill the nozzle. Thermal ink jet printing has been highly successful commercially due to the high nozzle packing density and the use of well established integrated circuit manufacturing techniques. However, thermal ink jet printing technology faces significant technical problems including multi-part precision fabrication, device yield, image resolution, 'pepper' noise, printing speed, drive transistor power, waste power dissipation, satellite drop formation, thermal stress, differential thermal expansion, kogation, cavitation, rectified diffusion, and difficulties in ink formulation.

Printing in accordance with the present invention has many of the advantages of thermal ink jet printing, and completely or substantially eliminates many of the inherent problems of thermal ink jet technology.

Comparison between Thermal ink jet and Present Invention

| | Thermal Ink-Jet | Present Invention |
|---|---|---|
| Drop selection mechanism | Drop ejected by pressure wave caused by thermally induced bubble | Choice of surface tension or viscosity reduction mechanisms |
| Drop separation mechanism | Same as drop selection mechanism | Choice of proximity, electrostatic, magnetic, and other methods |
| Basic ink carrier | Water | Water, microemulsion, alcohol, glycol, or hot melt |
| Head construction | Precision assembly of nozzle plate, ink channel, and substrate | Monolithic |
| Per copy printing cost | Very high due to limited print head life and expensive inks | Can be low due to permanent print heads and wide range of possible inks |
| Satellite drop formation | Significant problem which degrades image quality | No satellite drop formation |
| Operating ink temperature | 280° C. to 400° C. (high temperature limits dye use and ink formulation) | Approx. 70° C. (depends upon ink formulation) |
| Peak heater temperature | 400° C. to 1,000° C. (high temperature reduces device life) | Approx. 130° C. |
| Cavitation (heater erosion by bubble collapse) | Serious problem limiting head life | None (no bubbles are formed) |
| Kogation (coating of heater by ink ash) | Serious problem limiting head life and ink formulation | None (water based ink temperature does not exceed 100° C.) |
| Rectified diffusion (formation of ink bubbles due to pressure cycles) | Serious problem limiting ink formulating | Does not occur as the ink pressure does not go negative |
| Resonance | Serious problem limiting nozzle design and repetition rate | Very small effect as pressure waves are small |
| Practical resolution | Approx. 800 dpi max. | Approx. 1,600 dpi max. |
| Self-cooling operation | No (high energy required) | Yes: printed ink carries away drop selection energy |

-continued

Comparison between Thermal ink jet and Present Invention

| | Thermal Ink-Jet | Present Invention |
|---|---|---|
| Drop ejection velocity | High (approx. 10 m/sec) | Low (approx. 1 m/sec) |
| Crosstalk | Serious problem requiring careful acoustic design, which limits nozzle refill rate. | Low velocities and pressures associated with drop ejection make crosstalk very small. |
| Operating thermal stress | Serious problem limiting print-head life. | Low: maximum temperature increase approx. 90° C. at centre of heater. |
| Manufacturing thermal stress | Serious problem limiting print-head size. | Same as standard CMOS manufacturing process. |
| Drop selection energy | Approx. 20 μJ | Approx. 270 nJ |
| Heater pulse period | Approx. 2–3 μs | Approx. 15–30 μs |
| Average heater pulse power | Approx. 8 Watts per heater. | Approx. 12 mW per heater. This is more than 500 times less than Thermal Ink-Jet. |
| Heater pulse voltage | Typically approx. 40V. | Approx. 5 to 10V. |
| Heater peak pulse current | Typically approx. 200 mA per heater. This requires bipolar or very large MOS drive transistors. | Approx. 4 mA per heater. This allows the use of small MOS drive transistors. |
| Fault tolerance | Not implemented. Not practical for edge shooter type. | Simple implementation results in better yield and reliability |
| Constraints on ink composition | Many constraints including kogation, nucleation, etc. | Temperature coefficient of surface tension or viscosity must be negative. |
| Ink pressure | Atmospheric pressure or less | Approx. 1.1 atm |
| Integrated drive circuitry | Bipolar circuitry usually required due to high drive current | CMOS, nMOS, or bipolar |
| Differential thermal expansion | Significant problem for large print heads | Monolithic construction reduces problem |
| Pagewidth print heads | Major problems with yield, cost, precision construction, head life, and power dissipation | High yield, low cost and long life due to fault tolerance. Self cooling due to low power dissipation. |

Yield and Fault Tolerance

In most cases, monolithic integrated circuits cannot be repaired if they are not completely functional when manufactured. The percentage of operational devices which are produced from a wafer run is known as the yield. Yield has a direct influence on manufacturing cost. A device with a yield of 5% is effectively ten times more expensive to manufacture than an identical device with a yield of 50%.

There are three major yield measurements:

1) Fab yield
2) Wafer sort yield
3) Final test yield

For large die, it is typically the wafer sort yield which is the most serious limitation on total yield. Full pagewidth color heads in accordance with this invention are very large in comparison with typical VLSI circuits. Good wafer sort yield is critical to the cost-effective manufacture of such heads.

Figure 5:
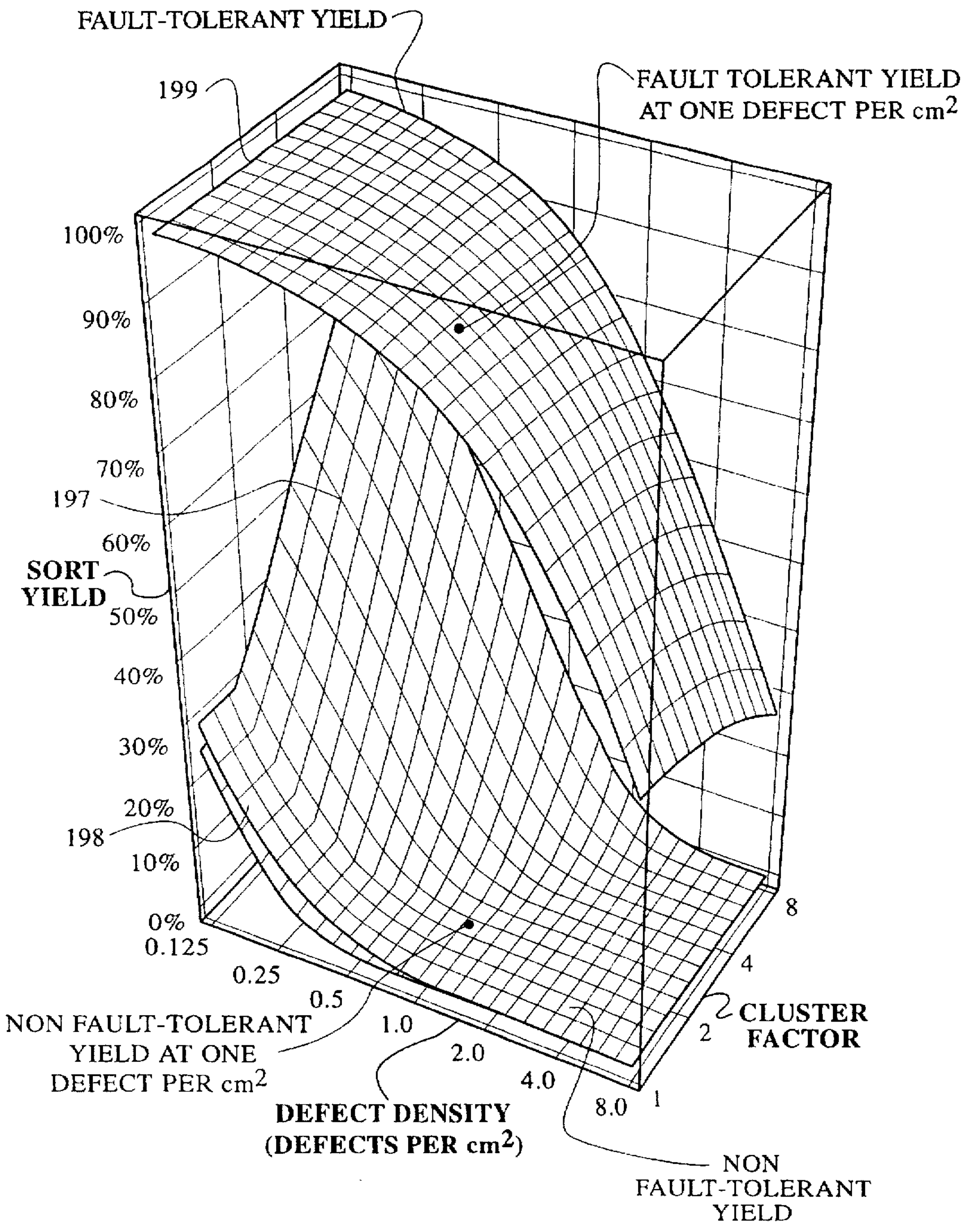
FIG. 5 shows projected manufacturing yields for an A4 page width color print head embodying features of the invention, with and without fault tolerance.

FIG. 5 is a graph of wafer sort yield versus defect density for a monolithic full width color A∝head embodiment of the invention. The head is 215 mm long by 5 mm wide. The non fault tolerant yield 198 is calculated according to Murphy's method, which is a widely used yield prediction method. With a defect density of one defect per square cm, Murphy's method predicts a yield less than 1%. This means that more than 99% of heads fabricated would have to be discarded. This low yield is highly undesirable, as the print head manufacturing cost becomes unacceptably high.

Murphy's method approximates the effect of an uneven distribution of defects. FIG. 5 also includes a graph of non fault tolerant yield 197 which explicitly models the clustering of defects by introducing a defect clustering factor. The defect clustering factor is not a controllable parameter in manufacturing, but is a characteristic of the manufacturing process. The defect clustering factor for manufacturing processes can be expected to be approximately 2, in which case yield projections closely match Murphy's method.

A solution to the problem of low yield is to incorporate fault tolerance by including redundant functional units on the chip which are used to replace faulty functional units.

In memory chips and most Wafer Scale Integration (WSI) devices, the physical location of redundant sub-units on the chip is not important. However, in printing heads the redundant sub-unit may contain one or more printing actuators. These must have a fixed spatial relationship to the page being printed. To be able to print a dot in the same position as a faulty actuator, redundant actuators must not be displaced in the non-scan direction. However, faulty actuators can be replaced with redundant actuators which are displaced in the scan direction. To ensure that the redundant actuator prints the dot in the same position as the faulty actuator, the data timing to the redundant actuator can be altered to compensate for the displacement in the scan direction.

To allow replacement of all nozzles, there must be a complete set of spare nozzles, which results in 100% redundancy. The requirement for 100% redundancy would normally more than double the chip area, dramatically reducing the primary yield before substituting redundant units, and thus eliminating most of the advantages of fault tolerance.

However, with print head embodiments according to this invention, the minimum physical dimensions of the head chip are determined by the width of the page being printed, the fragility of the head chip, and manufacturing constraints on fabrication of ink channels which supply ink to the back surface of the chip. The minimum practical size for a full width, full color head for printing A4 size paper is approximately 215 mm×5 mm. This size allows the inclusion of 100% redundancy without significantly increasing chip area, when using 1.5 μm CMOS fabrication technology. Therefore, a high level of fault tolerance can be included without significantly decreasing primary yield.

When fault tolerance is included in a device, standard yield equations cannot be used. Instead, the mechanisms and degree of fault tolerance must be specifically analyzed and included in the yield equation. FIG. 5 shows the fault tolerant sort yield 199 for a full width color A4 head which includes various forms of fault tolerance, the modeling of which has been included in the yield equation. This graph shows projected yield as a function of both defect density and defect clustering. The yield projection shown in FIG. 5 indicates that thoroughly implemented fault tolerance can increase wafer sort yield from under 1% to more than 90% under identical manufacturing conditions. This can reduce the manufacturing cost by a factor of 100.

Fault tolerance is highly recommended to improve yield and reliability of print heads containing thousands of printing nozzles, and thereby make pagewidth printing heads practical. However, fault tolerance is not to be taken as an essential part of the present invention.

Fault tolerance in drop-on-demand printing systems is described in the following Australian patent specifications filed on 12 Apr. 1995, the disclosure of which are hereby incorporated by reference:

'Integrated fault tolerance in printing mechanisms' (Filing no.: PN2324);

'Block fault tolerance in integrated printing heads' (Filing no.: PN2325);

'Nozzle duplication for fault tolerance in integrated printing heads' (Filing no.: PN2326);

'Detection of faulty nozzles in printing heads' (Filing no.: PN2327); and

'Fault tolerance in high volume printing presses' (Filing no.: PN2328).

Modular high speed digital color printing presses

Modular high speed digital color printing press can be constructed using drop on demand printing technology such as, e.g., coincident forces, liquid ink printing in accordance with my concurrently filed applications.

Such printers can accept information supplied by an external raster image processor (RIP) in the form of a halftoned raster at 600 dots per inch. This is stored in a bi-level page memory. Many printing modules can be supplied with information from a single RIP, and can print simultaneously. The contents of the page memory can then be printed using the printing head.

This system has a number of advantages over alternative technologies. These include:

1) Modularity: printing speed can be increased by adding low cost modules.
2) Small size: each printing module can be compact
3) Consistency: the image quality generated is consistent, as each dot is digitally controlled.
4) Reliability: the system is fault tolerant, increasing reliability.
5) Perfect registration: the four process colors are printed using a monolithic silicon printing head. The nozzles of this head can be fabricated with a relative position tolerance of less than one micron. This eliminates the need to align four color passes, as is usually required.
6) High quality with lower resolution: the amount of ink deposited is directly proportional to the number of dots printed. The position of each dot is also controlled. Therefore it is not necessary to use clustered dot ordered dithering to digitally halftone the continuous tone images. Instead, computer optimized dispersed dot ordered dithering can be used. Combined with seven color printing, photographic image quality equivalent to that achieved by conventional presses using up to 1,800 dots per inch can be achieved using only 600 dots per inch. This reduces the time and cost of the raster image processing (RIPping) required, as well as reducing the cost and increasing the speed of the printing process.
7) Implicit collation: if a number of printer modules are set up to simultaneously print successive sheets of a multipage color document such as a magazine, then the result can be automatically collated without requiring special equipment.
8) Flexibility: The image to be printed can be changed instantly.

Table 1, "Example product specifications," shows the specifications of one possible configuration of a high performance color printing module using coincident forces, liquid ink printing technology.

Example product specifications

| Configuration | Floor standing, web fed |
|---|---|
| Web width | 420 mm |
| Printer type | 4 x LIFT A4 page width printing heads |

-continued

| Example product specifications | |
|---|---|
| Configuration | Floor standing, web fed |
| Number of nozzles | 158,976 active nozzles, 158,976 spare nozzles |
| Printing speed | 128 A4 ppm duplex (37 A3 sheets per minute) |
| Printer resolution | 800 dpi |
| Dimensions (W × D × H) | 600 × 600 × 2,000 mm |
| Reliability | Fault tolerant at print head and module level |
| Page description language | Adobe Postscript* level 2 |
| Connectivity | 100 BaseT Ethenet |

Some other features of the printing system are:

1) The heads from both sides of the paper are at the same horizontal level, allowing the ink pressure for both heads to be identical when fed from a common ink reservoir where the ink pressure is determined by ink column height.
2) The paper movement conveyor belt is modular, allowing entirely modular construction of a multi-unit printing line.
3) The roll of blank paper is mounted on a frame which can be simply wheeled into the printing module whenever the paper needs to be replenished.
4) The roll of blank paper can be at ground level, underneath the printing heads, drying region, paper cutter, and document conveyor belt. This arrangement has the significant advantage that the paper roll can be simply wheeled into place when the paper requires changing, without requiring a fork-lift truck or special machinery.

The table "LIFT head type Web-6-800"(see Appendix A) is a summary of some characteristics of an example full color two chip LIFT printing head suitable for high speed web-fed A3 printing. A single printing module of the digital color printing press uses two of these print heads to print the four pages of a magazine sheet simultaneously.

Modular printing system description

Figure 6:
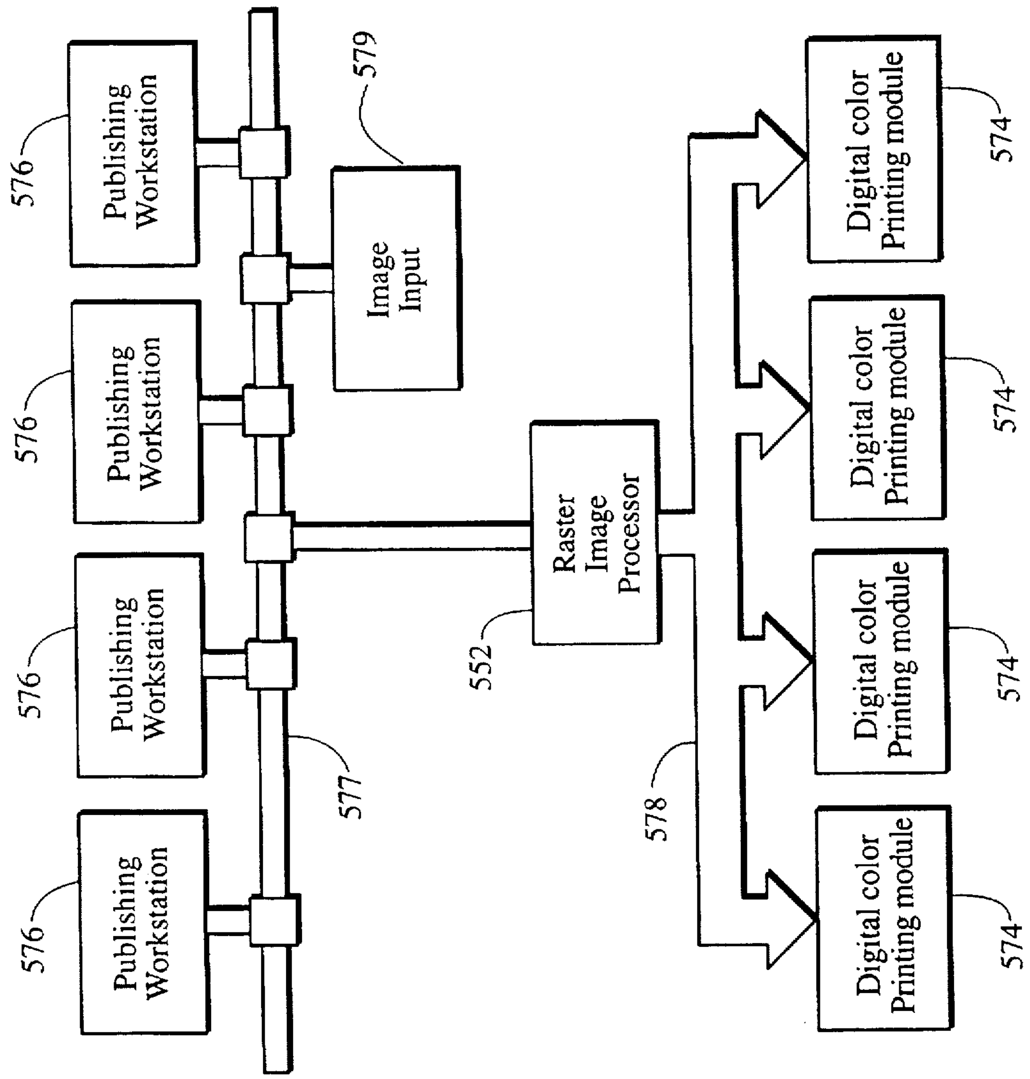
FIG. 6 shows a schematic system diagram of one preferred digital printing configuration using digital color printing modules.

FIG. 6 shows a simplified system configuration for a high speed color publishing and printing system. Text is created, images are scanned, graphics are created, and pages are laid out using computer based color publishing workstations 576. These can be based on personal computers such as the Apple Macintosh and IBM PC, or on workstations such as those manufactured by Sun and Hewlett-Packard. Alternatively, they can be purpose built publishing workstations. Information is communicated between these workstations using a digital communications local area network 577 such as Ethernet or FDDI. Information can also be brought into the system using wide area networks such as ISDN, or by physical media such as floppy disks, hard disks, optical disks, CDROMs, magnetic tape, and so forth. This information may be in the form or raster images, such as TIFF files and Scitex files, page description language files such as Adobe Postscript, or native files from computer application programs such as Aldus Pagemaker, Quark Express, or Adobe Photoshop. Color images can be acquired using an image input device 579 such as a drum scanner, a flatbed scanner, or a slide scanner and incorporated in the page layouts. Proofing devices, such as low volume color printers and copiers can be incorporated into the network. Also appropriate for color publishing is PhotoCD jukeboxes or other image libraries.

When the page layout is completed, it is sent to the raster image processor (RIP) 552. The raster image processor converts the page layout information (which is typically in the form of a page description language) into a raster image. This module also performs halftoning, to convert the continuous tone image data from the scanned photographs, graphics and other sources into bi-level image data.

There are several Page Description Languages (PDLs) in common use. These include Adobe's PostScript language and Hewlett Packard's PCL5. The raster image processor can either support a single PDL, or an automatic PDL selector can detect the PDL being used from the data stream, and send the PDL data to an appropriate PDL interpreter. Other non-PDL image formats are also commonly used in the professional Pre-press and printing markets. These include the formats used by digital pre-press machines, such as Scitex format, Linotype-Hell format, and Crosfield format.

The PDL interpreter can interpret a scan-line rendering PDL. Such interpreters can create the page image in scan-line order, without reference to a frame memory. The continuous tone data can be produced in raster order, so may be error diffused before being stored in a bi-level image memory. For highest quality, the digital halftoning algorithm can be vector error diffusion. This operates by selecting the closest printable color in three dimensional color space to the desired color. The difference between the desired color and this printable color is determined. This difference is then diffused to neighboring pixels. The vector error diffusion function accepts a raster ordered continuous tone (typically 24 bit per pixel) input image and generates a bi-level output with one bit per color per pixel (four bits for CMYK, 6 bits for CC'MM'YK, 7 bits for CC'MM'YKK'). This is then stored in a bi-level page memory. In the case of a 800 dpi, A3 color, with four colors the Bi-level page memory requires approximately 58 MBytes per page (when not compressed). With six colors the Bi-level page memory requires approximately 88 MBytes per page. The bi-level page memory can be implemented in DRAM. An alternative to providing a full Bi-level page memory is to use a compression scheme, and provide a compressed page memory, a real-time expansion system, and a bi-level band memory. This can reduce the memory requirements significantly. The Bi-level page memory or compressed page memory may be a section of the main memory of the raster image processor. The functions of the raster image processor are primarily to interpret the PDL. The raster image processor may also perform the digital halftoning. Alternatively, this may be performed by digital hardware in the form of an ASIC. However, this function is relatively simple when compared to the PDL interpretation, and can readily be performed by the processor.

PDL interpreters which require random access to a page memory cannot use error diffusion as a means of halftoning, as error diffusion requires access to the continuous tone information in scan-line order. A practical solution is to use ordered dithering instead of error diffusion. PDL interpreters in current use typically use a clustered dot ordered dither to reduce the effects of non-linear dot addition that occurs with laser printers and offset printing. However, dot addition using the printing process is substantially linear, so dispersed dot ordered dithering can be used. Computer optimized dispersed dot ordered dither provides a substantially better image quality than clustered dot ordered dither, and more efficient to calculate than error diffusion.

Once a binary image of the page has been created, it can be sent to the appropriate digital color printing module 574 for printing. A single page can be changed at a time, or both sides of the sheet can be changed. It is also possible to change only a portion of a page. This has application for personalizing color printed documents for mass mailing. The data is transferred by a digital data link 578. If the data must be changed quickly, this should be a high speed data link. 116 MBytes of information must be transferred to change a complete sheet when printed with seven colors. The high speed data link may be FDDI, which can theoretically transfer the data in less than 12 seconds. In practice, however, longer data transmission times are likely. SCSI is also a possible data transfer system. However, the long physical distances and high electrical noise environments of a large printing establishment means that much care must be taken to ensure data integrity if SCSI is used.

Figure 7:
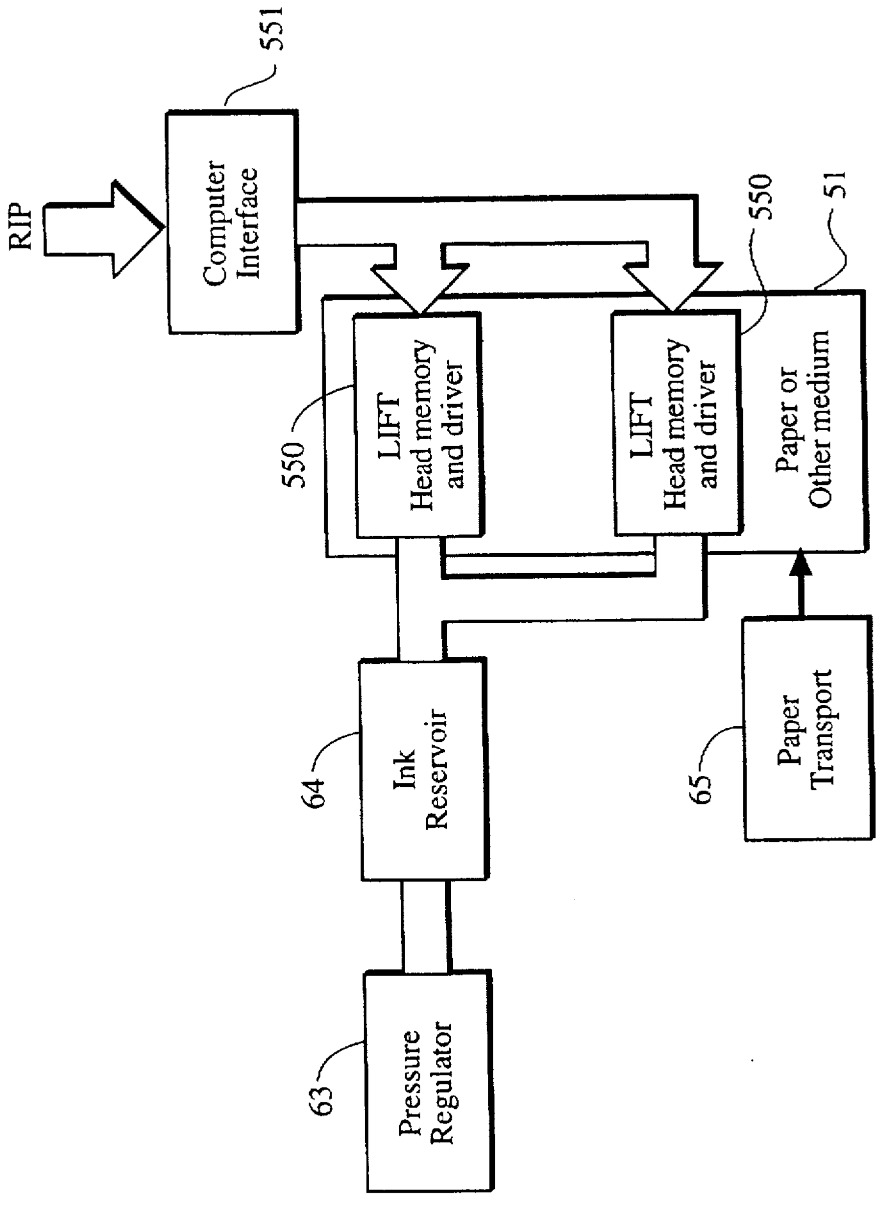
FIG. 7 is a simplified schematic of one preferred digital color printing press module

FIG. 7 shows a simplified block diagram of a single digital color printing module 574. A computer interface 551 accepts data from the raster image processor 552 via the high speed data link 578. This data is stored in the bi-level page memory of the appropriate print head, page memory and driver module 550. There are two modules 550, one for each side of the sheet. Pressure regulators 63 maintain pressure in ink reservoirs 64. Pressure regulators and ink reservoirs are required for each of the printing colors. Each of the ink colors is supplied to each of the full color printing heads in the modules 550. A paper transport system 65 moves the paper 51 passed the fixed heads.

Figure 8:
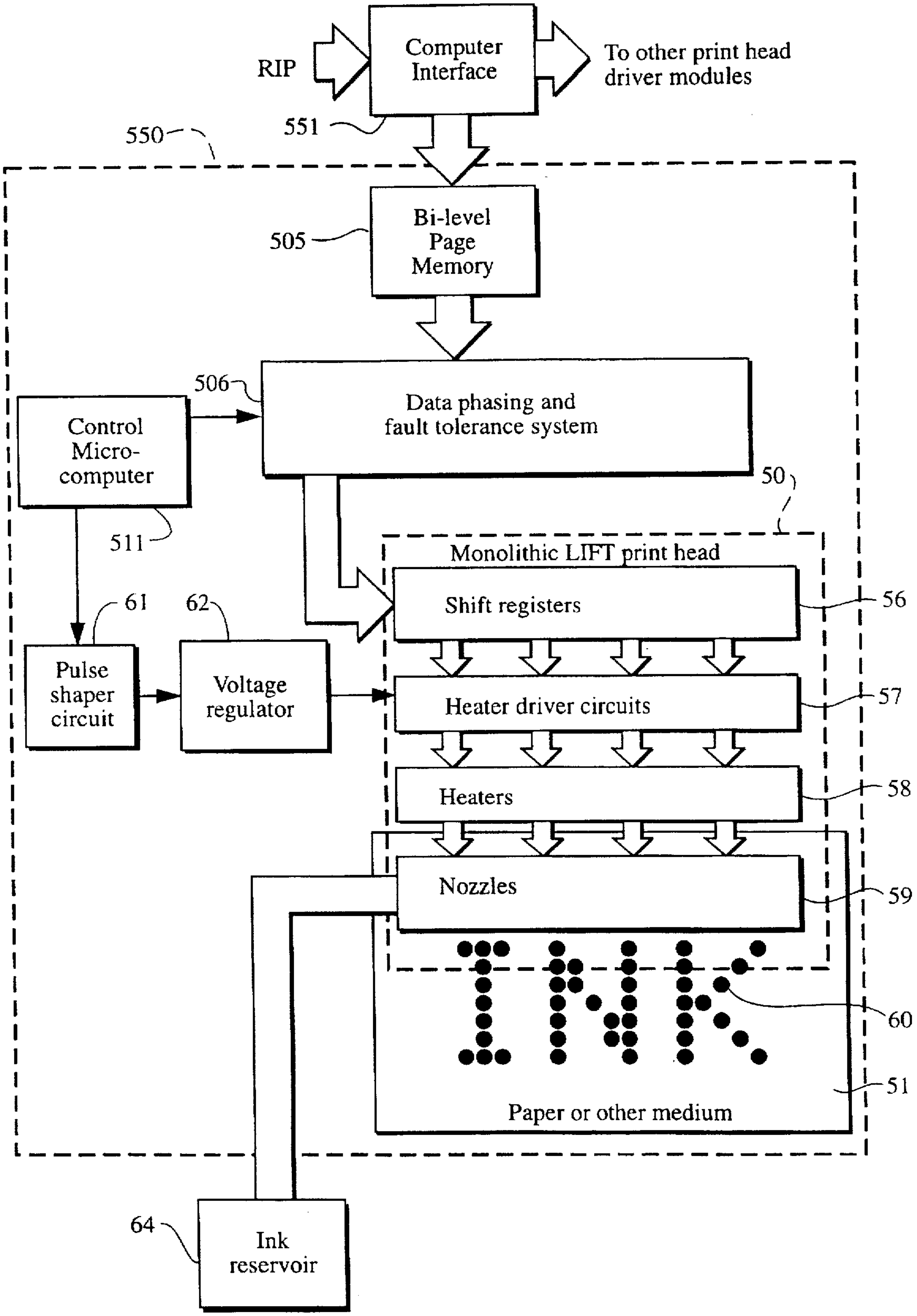
FIG. 8 shows a simplified schematic diagram of a single printing head driver system of a digital color printing press using printing technology of the FIG. 1 system.

FIG. 8 is a schematic process diagram of a printer head, memory, and driver module 550 according to one preferred embodiment of the invention. The computer interface 551 writes the binary image of the page to the bi-level page memory 505. When a page is to be printed, the bi-level page memory 505 is read in real-time. This data is then processed by the data phasing and fault tolerance system 506. This unit provides the appropriate delays to synchronize the print data with the offset positions of the nozzle of the printing head. It also provides alternate data paths for fault tolerance, to compensate for blocked nozzles, faulty nozzles or faulty circuits in the head.

The printing head 50 prints the image 60 composed of a multitude of ink drops onto a recording medium 51. This medium will typically be paper, but can also be coated plastic film, cloth, or most other substantially flat surfaces which will accept ink drops.

The bi-level image processed by the data phasing and fault tolerance circuit 506 provides the pixel data in the correct sequence to the data shift registers 56. Data sequencing is required to compensated for the nozzle arrangement and the movement of the paper. When the data has been loaded into the shift registers, it is presented in parallel to the heater driver circuits 57. At the correct time, these driver circuits will electronically connect the corresponding heaters 58 with the voltage pulse generated by the pulse shaper circuit 61 and the voltage regulator 62. The heaters 58 heat the tip of the nozzles 59, reducing the attraction of the ink to the nozzle surface material. Ink drops 60 escape from the nozzles in a pattern which corresponds to the digital impulses which have been applied to the heater driver circuits. The ink drops 60 fall under the influence of gravity or another field type towards the paper 51. The various subsystems are coordinated under the control of one or more control microcomputers 511.

Figure 9:
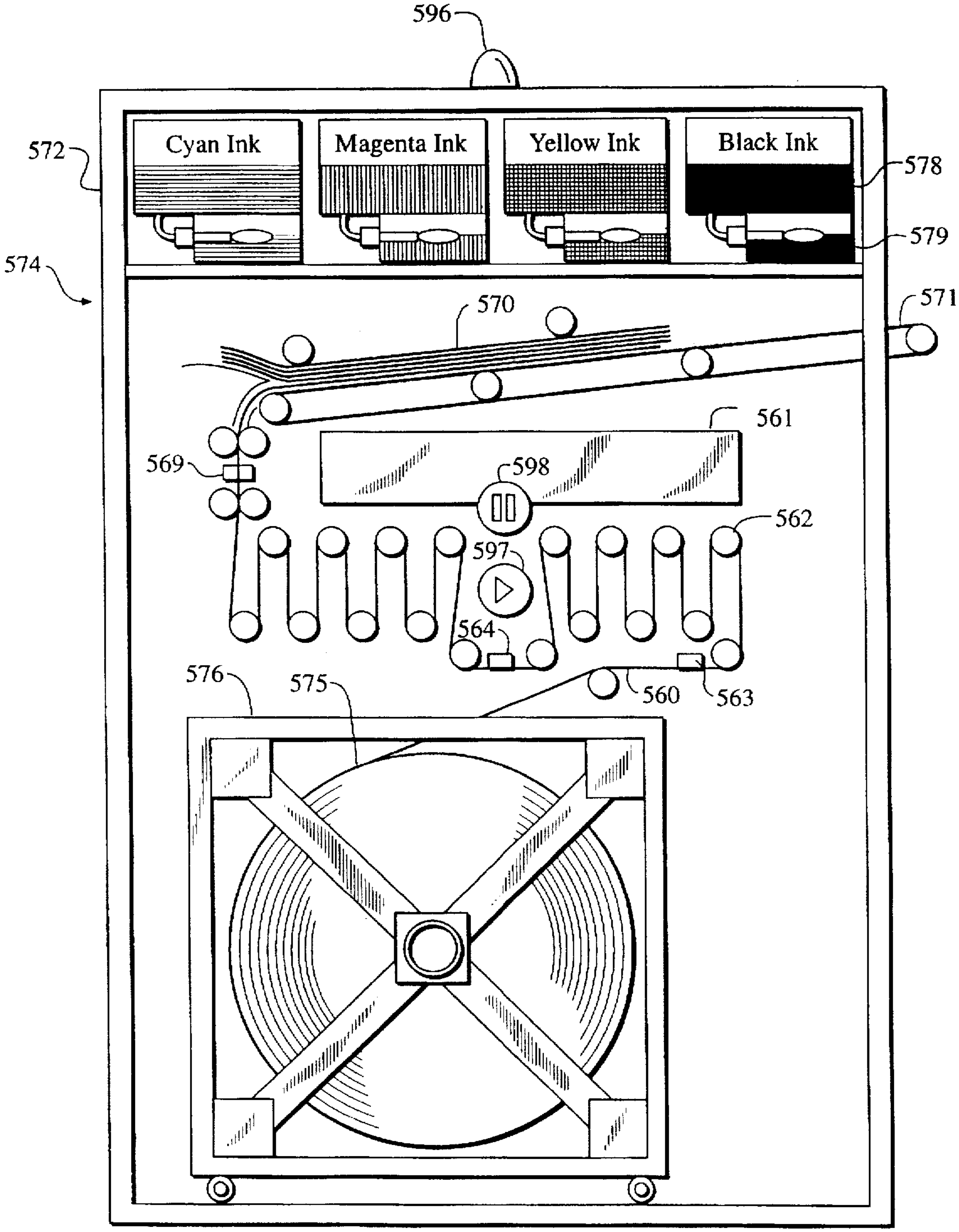
FIG. 9 shows the major modules and the paper path of a single printing module.

FIG. 9 shows a simplified mechanical schematic diagram of a possible implementation of the invention. This diagram is schematic only, and is not intended to represent an actual recommended physical arrangement. The design of paper transport systems is well known, and the principles disclosed herein can be readily applied to a variety of physical configurations persons skilled in the art. The drive electronics 561 consist of two head driver circuits and one computer interface circuit. The two head driver circuits provide synchronized data and control signals for the two heads 563 and 564. The head 563 prints on one side of the paper 560. The head 564 prints on the other side of the paper 560. The paper is supplied in continuous rolls, and the paper transport is performed by a series of rollers 562. After one side of the paper is printed by head 563, the paper is dried and turned over by the rollers so that the other side can be printed by head 564. This is required if gravity is the principle force that moves the ink drops from the head to the paper, but may not be necessary if the ink drops are accelerated by a strong electrical or magnetic field. After printing each side, the paper moves through a forced air drying region, which may use heated air to accelerate drying. This allows the physical size of the printing module 574 to be minimized. The paper is then cut into sheets by the automatic paper cutter 569.

Gravity feed of the ink is a convenient way to obtain a stable and accurate ink pressure at the heads. Gravity feed allows the ink to be replenished without interrupting the print cycle. The ink reservoirs 572 can contain an automatic level maintaining system, which may consist of a master reservoir 578 which is connected to a reservoir 579. The ink level in the reservoir 579 is regulated by a mechanism which may be a float valve, or may be an electrical level sensor which controls an electromechanical valve. The level of ink in the reservoir 579 is adjusted such that the ink pressure caused by the difference in height between the head and the ink level is the optimum operating pressure for the head. The ink flowing to the master reservoirs 578 can be piped from a central reservoir which feeds all of the printing modules in a print shop. In this manner, no manual filling of the ink reservoirs of the individual print modules is required. Four ink reservoirs are shown in FIG. 9. The number of ink reservoirs required depends upon the number of ink colors to be printed. Seven ink reservoirs are required for CC'MM'YKK' printing.

To maintain the correct pressure, the ink level in the reservoir must be a specific height above the printing surface of the heads. The two heads 563 and 564 are set at the same height, so a single set of reservoirs 573 supply the heads by gravity feed.

The paper 560 can be supplied on rolls 575. As paper rolls of substantial length may be very heavy, there may be difficulty in changing the paper rolls. This can be alleviated by supplying the paper rolls in a sturdy frame 576, which may include caster wheels attached to the frame. The modular printing system can be arranged so that the frame 576 of the paper roll 575 is at floor level. When the paper roll is empty, the frame is simply wheeled out of the printing module. A full paper roll is then wheeled into the printing module, and the paper is 'threaded' through the printing mechanism. The entire operation can be completed in a few minutes, without requiring fork lift trucks or other equipment.

A fault indicator light 596 indicates when the printing module 574 requires human attention. This attention may be required to replace the paper roll when empty, or to correct a fault. A human operator can also stop the machine by pressing the pause button 598. When the printing module stops due to an internally detected condition, or through pressing the pause button, printing and paper transport stops. However, the conveyor belt 571 does not stop. This is important to maintain fault tolerant operation, as discussed later in this document.

In many cases, multi-sheet documents must be printed. To achieve this a number of digital color printing press modules can be used to maintain document printing rates at 60 copies per minute. For example, if a 100 page color magazine is to be printed, 25 printing modules can be used. Each module prints four pages simultaneously in one second. The printed sheets 570 are transported on a conveyor belt 571, with each module adding one sheet to each stack.

Figure 10:
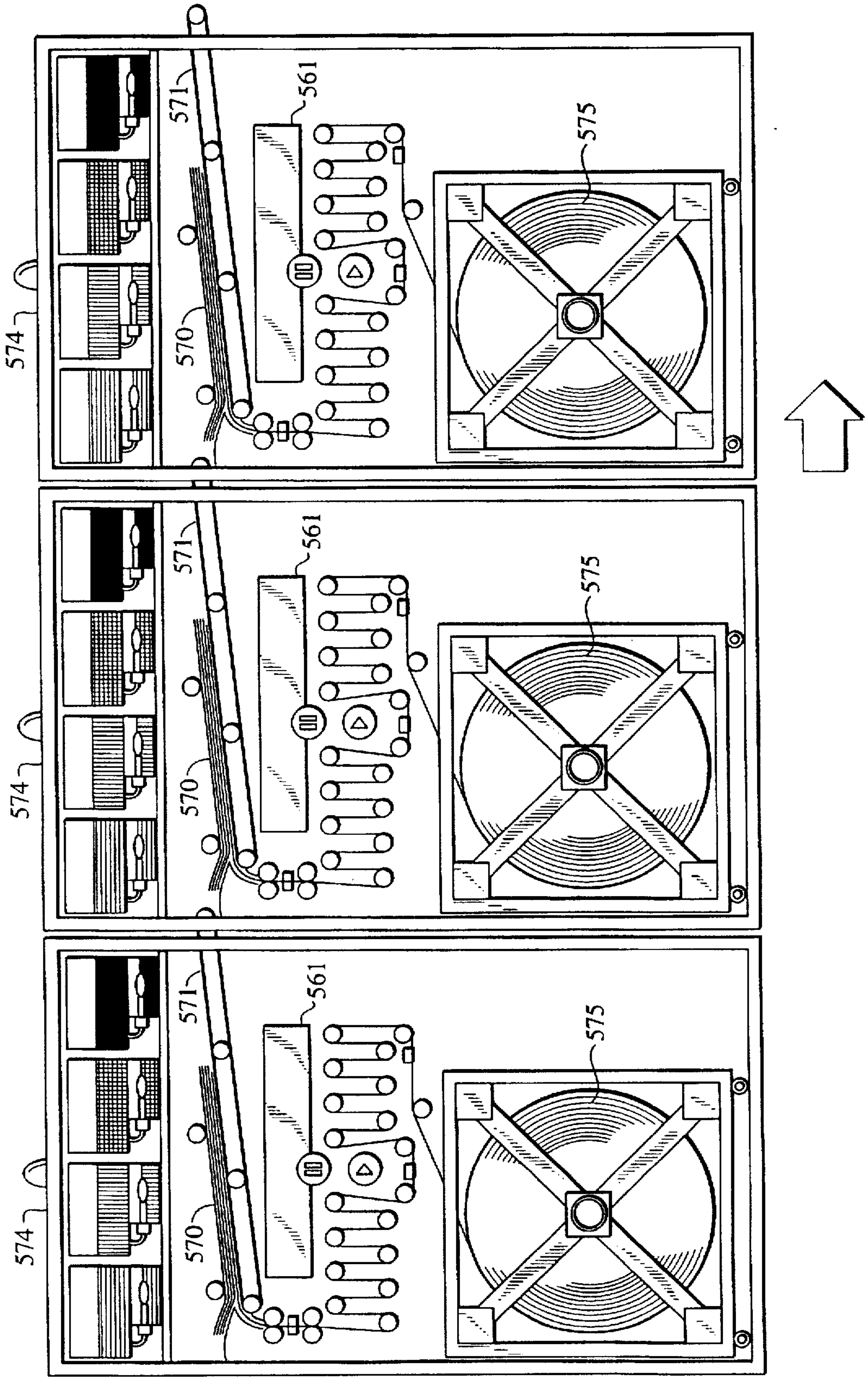
FIG. 10 shows three modules of a high volume printing line.

FIG. 10 shows three adjacent digital color printing modules 574 on a high volume printing line. The printing modules 574 are supplied with paper from rolls 575. The printing modules print the pages, which automatically fall in stacks 570 on the conveyor belt 571. The last machine on the conveyor belt can be an automatic binding machine. It is not necessary to have just one line of printing modules. The printing modules can be arranged to suit the collation and binding process. For example, many books and thick magazines are bound as a plurality of groups of 32 pages (eight sheets), which are then glued into a cover. This binding method can be accommodated by operating a number of short lines each containing eight printing modules.

This modular approach to high volume printing has many advantages, including:

1) The entry cost for a printer is low, as a single printing module can be used. Even a single printing module is capable of 360 A4 pages per minute.
2) The maximum capability of a single printing line is high, as 86,000 copies of a color document (for example, a magazine) of any length can be printed per day, when using one printing module per document sheet.
3) Maintenance requirements are very low.
4) There is almost no down-time required to change the images on the pages being printed.
5) Service is simple, with replaceable units.
6) The development and manufacturing cost can be amortized over a large number of small modules.
7) The printing system can be made fault tolerant, with operation of the printing line automatically restored within one second of detection of a module fault.

System-level fault tolerance in modular printing systems

Reliability of large printing systems can be very important, as the printing industry often operates 24 hours a day, and on short deadlines. A modular printing system which comprises many printing modules, each with complex digital circuitry and paper movement mechanical systems, generally could be expected to have a lower reliability than a single large mechanical offset press. For modular direct digital printing to succeed commercially, it is essential that system reliability approach or exceed that of current mechanical offset presses. This can be achieved through the implementation of system—level fault tolerance.

The present invention provides a method and apparatus for restoring operation in a modular digital color printing press prior to the correction of the fault causing operation of one module to fail has been invented. One preferred embodiment of such system comprises:

(a) the provision of at least one additional spare printing module to the number of printing modules required for the printing task in the absence of a fault, the spare printing module being the most downstream of the printing modules for which faults are to be compensated;

(b) transfer of the data representing the page or sheet to be printed to a downstream printing module after detection of a fault in a faulty printing module;

(c) transfer of the data in the downstream printing module to the printing module downstream of the printing module prior to or substantially simultaneously to the transfer of data into the downstream printing module from the faulty printing module;

(d) The repeat of step (c) for subsequent downstream printing modules, the last printing module for which data is transferred into being the spare printing module;

(e) the discontinuation of printing by the faulty printing module; and (f) the continuation of printing by other printing modules, including the spare printing module.

The system may also include a method of restoring normal operation in a modular digital color printing press after the correction of the fault comprising:

(g) transfer of the data representing the page or sheet to be printed from the spare printing module to the printing module directly upstream of the spare printing module after the fault in the faulty printing module has been corrected;

(h) transfer of the data in the upstream printing module to the printing module upstream of the printing module prior to or substantially simultaneously to the transfer of data into the upstream printing module from the spare printing module;

(i) The repeat of step (h) for subsequent upstream printing modules, the last printing module for which data is transferred into being the previously faulty printing module;

(j) the discontinuation of printing by the spare printing module; and (k) the continuation of printing by other printing modules, including the previously faulty printing module.

Figure 11A:
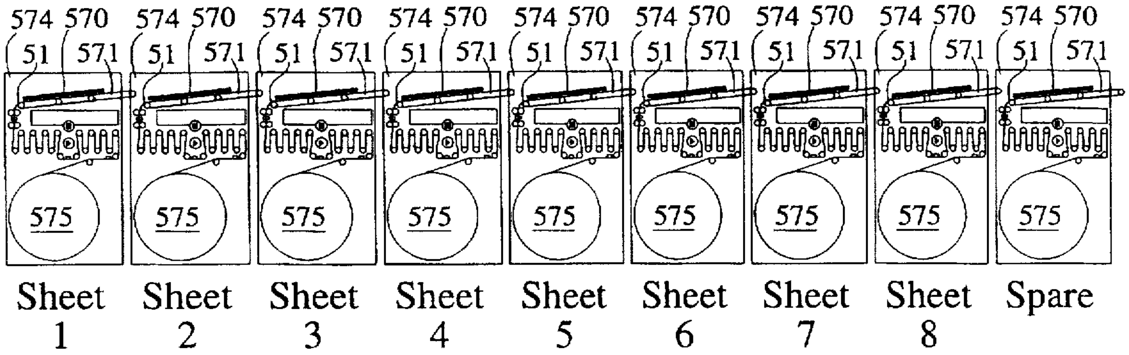
FIG. 11(*a*) shows a modular printing line printing a ten sheet document.
Figure 11B:
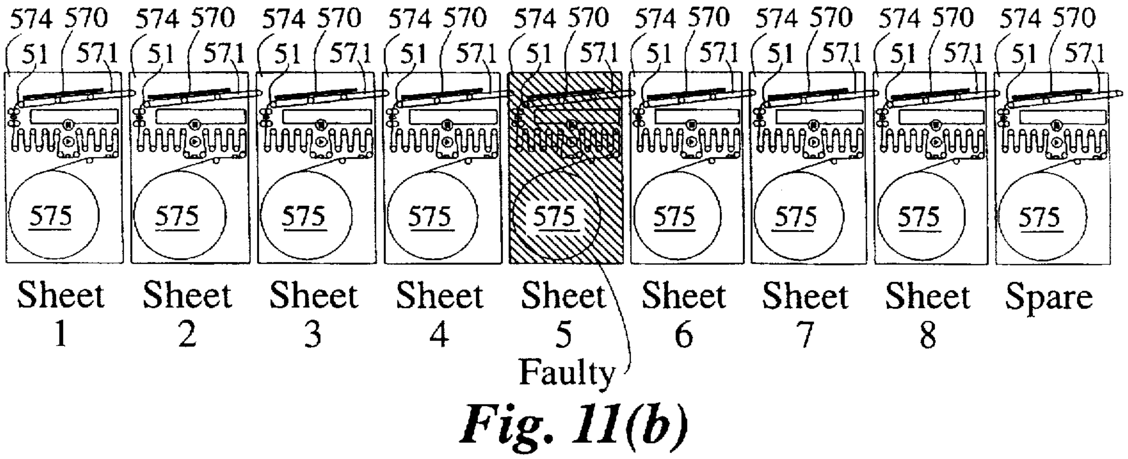
Figure 11C:
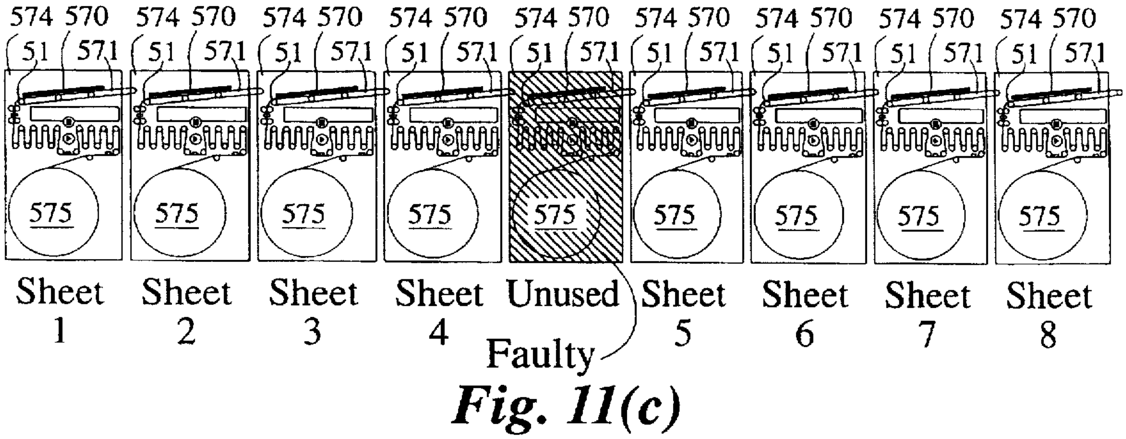

FIG. 11 (*a*) shows a printing 'assembly line' which uses eight printing modules 574 to print a thirty two page (eight sheet) document. A ninth module 574 is provided as a spare in accordance with the approach of the present invention. The printed sheets are transferred from one module to the next by means of a modular conveyor belt 571. Each active printing module adds one sheet to the paper stack, so eight active modules will create a stack eight sheets high. Such a system is capable of printing a thirty two page full color document every second.

FIG. 11 (*b*) shows the consequences of a fault in the printing module which is printing sheet 5. In a system which does not use fault tolerance, the entire printing line must be stopped until the fault is corrected. The fault may be any event which prevents the printing of the sheet of the document, such as running out of paper or ink, or a mechanical or electronic fault. It is clear that as the number of printing modules in use increases, the mean time between failures (MTBF) decreases. The cost of downtime also increases, as more printing modules are idle while the fault is repaired. If the printing module takes one hour to repair or replace, the printing assembly line will be inoperative for a time that would otherwise be sufficient to print 3,600 copies of the document.

FIG. 11(*c*) shows a solution to this problem. As soon as the fault is detected, the digital image data describing sheet 5 is transferred to the printing module which was printing sheet 6. Simultaneously, the data describing sheet 6 is transferred to the printing module which was printing sheet 7, and the data describing sheet 7 is transferred to the printing module which was printing sheet 8. The data for sheet 8 is transferred to a spare printing module at the end of the printing line. If this data transfer can occur in less than the time required to print a sheet, the line can continue printing without stopping, and without any wastage of printed copies.

If more than one spare printing module is included at the end of the printing 'assembly line', then more than one simultaneous fault can be accommodated without productivity loss.

This principle can be applied to other types of modular printing presses which do not use other printing heads.

This system can be implemented without requiring any additional hardware to be incorporated in the printing modules 574. However, such a minimum implementation is not necessarily desirable. For example, data transfer for fault tolerance can be achieved by re-transmitting the data from the raster image processor 551 to each of the printing modules where the data must be altered. This data is transmitted over the high speed data link 578 in the same manner as when the data is initially transmitted to the modules upon setup for the printing run. If each printing module 574 prints four A4 pages at 600 dpi in 7 colors, then 116 MBytes of image data must be transferred for each module for which the data is to be changed. In a printing line with 8 active printing modules, this means that 928 MBytes must be transferred across the data link 578. If the data link 578 is an FDDI connection with a maximum data rate of 100 Mbps, then at least 84 seconds would be required to transmit the data. In practice, the data would take a much longer time to transmit over FDDI. If the data was stored on a conventional hard disk drive with an average sustained data access time of 1 MByte per second installed in the raster image processor 551, then it would take a minimum of 928 seconds to access this data and transmit it to the printing modules. This time may be comparable to the mean time to repair (MTTR) of a typical fault in a printing module. In this case, no advantage is gained by incorporating fault tolerance in the production line.

An alternative to storing the data on a hard disk drive, is to store it in semiconductor memory in the raster image processor 551. In this example, 928 MBytes of semiconductor memory would be required in addition to the normal operating requirements of the raster image processor. This approach can speed the recovery of the system, but is expensive. It is also inflexible, as more memory is required if the number of printing modules in the printing line is greater than eight.

To benefit from the fault tolerance method described herein, the time taken to re-load the data to the printing modules should be substantially less than the MTTR. Ideally, it should also be less than the time taken to print one sheet. If this is achieved, the printing line can continue operating when a fault is detected without stopping the conveyor belt 571 and without printing any incomplete copies of the document.

This requirement can be met by providing bi-directional data transfer links between successive printing modules 574. As successive printing modules in the printing line will typically be physically adjacent, the high speed bi-directional data links can be simply provided by short point-to-point parallel connections. The data transfer rate required is 116 MBytes per second. This can readily be provided by a 32 bit parallel cable operating at 29 MHz. High reliability can be achieved by using ECL balanced line drivers into twisted pair shielded cables over distances in excess of five meters. This will be adequate for direct connection between printing modules in typical printing line configurations. Such connections can be constructed using well known commercially available technology. For example, the parallel digital television standard for broadcast television production uses 8 bit parallel cables using balanced line ecl drivers, operating at 27 MHz. This technology can readily be operated at 29 MHz, and the data bus width can easily be extended to 32 bits. This technology is uni-directional. Bi-directional operation can be established by providing cables in both directions. Data communications between adjacent modules can also be established using more recent technologies, with much fewer connections.

Figure 12A:
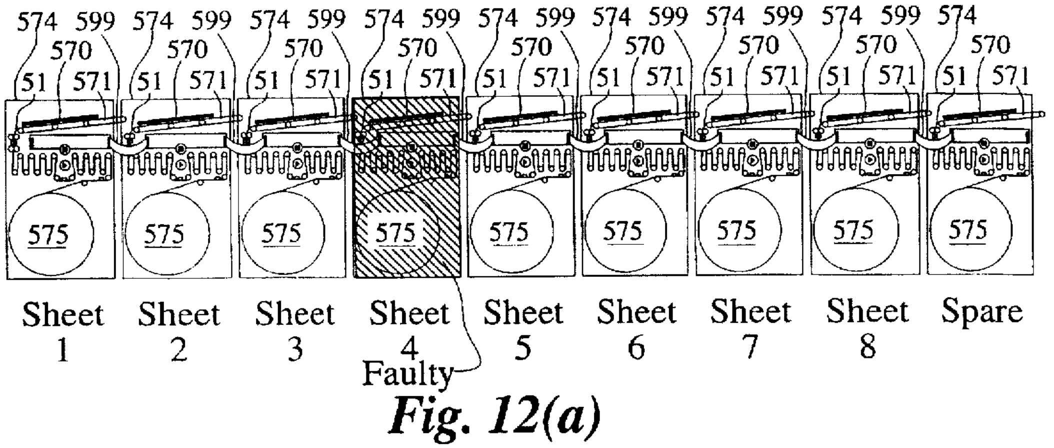
FIG. 12(*a*) shows a modular printing line with a bidirectional data connection between adjacent printing modules.
Figure 12B:
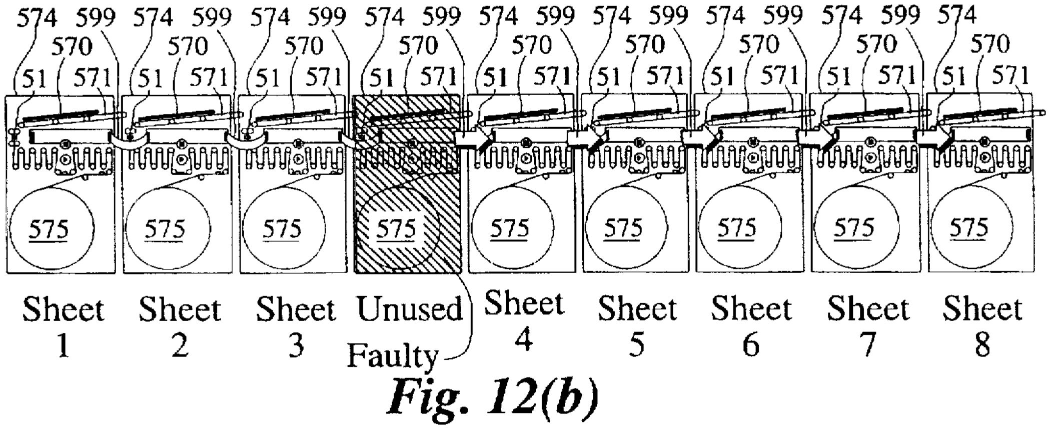
Figure 12C:
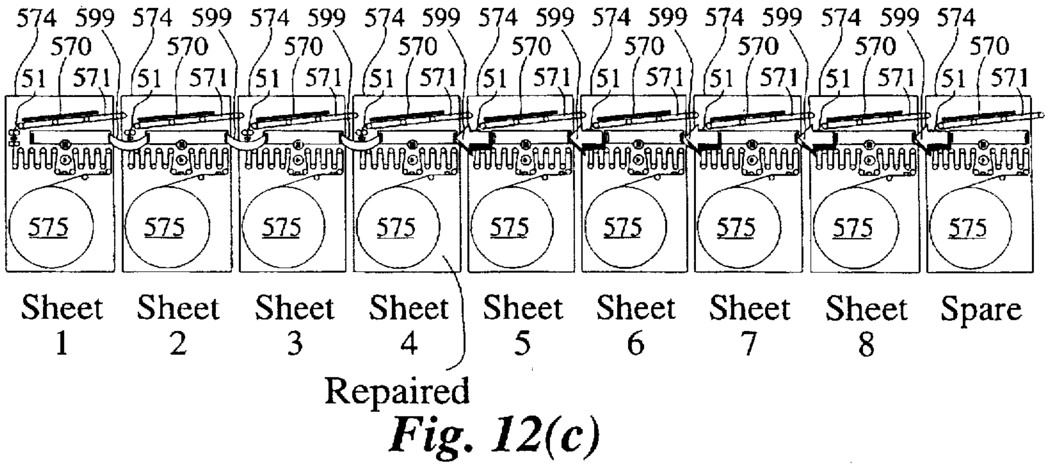

FIG. 12(*a*) shows a bi-directional data transfer cable 599 connecting adjacent pairs of printing modules 574. This shows a system configured to simultaneously print eight sheets of a document, utilizing a total of eight active printing modules and one spare module. In this example, the module printing sheet four has failed. In many cases, failure can be automatically detected. Such cases include running out of paper or ink, paper jams, or failure of various portions of the circuitry which may be automatically tested on a continual basis. The printing unit also can have a pause button 598 (FIG. 10) which causes the appropriate module to stop printing. This can be activated at any stage by a human operator if a fault which is not automatically detected occurs. It can also be activated for any other reason that it is required that a module stop printing, for example; for regular maintenance, adjustment or calibration. Automatic detection of a fault or a human command for the module to stop printing result in the same sequence of subsequent actions, so are treated identically.

FIG. 12(*b*) shows page image data being transferred via the point-to-point data links 599. If the data is transferred completely synchronously and simultaneously between all of the modules, no additional memory storage capacity beyond that normally required for the printing module 574 is required. If the data is completely transferred within the time taken to print a sheet, printing can proceed uninterrupted. Once data has been transferred to 'downstream' printing modules and printing resumes, the fault in the printing module can be repaired without causing a line stoppage. The entire printing module electronics 561 or paper roll 575 can even be replaced without stopping the printing process.

FIG. 12(*c*) shows operation immediately after a faulty unit has been repaired or otherwise put back into operation. Data is transferred back to the original printing modules via the bi-directional data links 599. After restoration of the printing process, all of the copies of the document which were at, or downstream of, the faulty print module at the time of restoration should be removed from the printing line, as they will be incorrectly collated. In this example, there will be six such copies. These copies can either be discarded or manually collated.

The conveyor belt 571 of the faulty module must continue to operate while the module is being repaired or replenished with paper or ink. As a result, the system is not tolerant of faults in the conveyor belt. However, the conveyor belt is a simple mechanical mechanism, which can readily be constructed to have a very high MTBF. More significant than conveyor belt failure, however, is that modules cannot be replaced while the system is operating. An alternative system where the conveyor belt is separate from the printing modules 574 is possible, and will solve this problem. However, the advantages of an integrated modular conveyor belt outweighs the disadvantage of not being able to exchange entire modules while they are operating.

Figure 13:
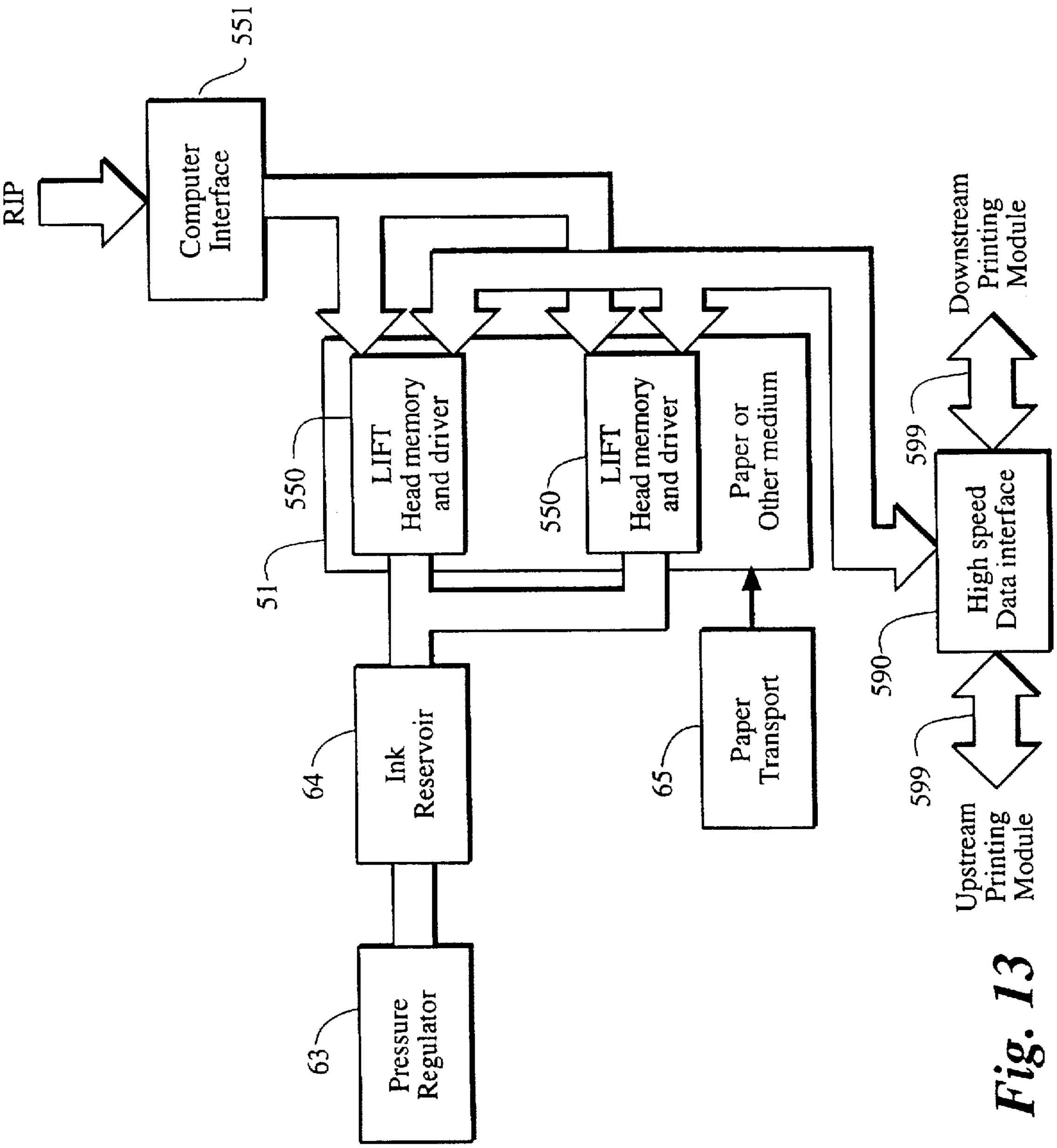
FIG. 13 is a simplified schematic of a digital color printing press module which includes high speed data links to adjacent printing modules.

FIG. 13 shows a simplified block diagram of a single digital color printing module 574 which incorporates direct data connections to adjacent printing modules. There are two data interfaces 599 which must be able to operate simultaneously. When initialized for a new print run, a computer interface 551 accepts data from a raster image processor via a high speed data link. This data is stored in the bi-level page memory of the appropriate print head, page memory and driver module 550.

When a fault is detected, a message is transmitted to downstream printing modules. This messages may be in the form of a change of state of a single signal, or may be a sequence of digital codes, or other signaling method. Data in the bi-level page memories contained in the head memory and driver modules 550 is then transferred to the high speed data interface 590. This data is transferred to the downstream printing module via the downstream data link 599. The downstream data link of a module is equivalent to the upstream data link of the module directly downstream from it.

When a fault is identified in an upstream printing module, a signal indicating this will be received. This signal is passed on to downstream printing modules. Data from the upstream printing module will be received by the high speed data interface 590 via the upstream data link 599. This data is stored in the bi-level page memory. Prior to storing received data in a memory location, the data at that location is read and sent to the downstream printing module via the computer interface and downstream data link 599. The total data transfer rate to and from the bi-level page memories of a printing module is 232 MBytes per second, sustained for one second. Care must be taken in the design of the data link circuitry not to overwrite the contents of the bi-level page memory before the contents are transmitted to the downstream printing module. This can be achieved by operating the upstream and downstream data links in a completely synchronous manner, and operating the bi-level page memory in alternating read-write cycle. Alternatively, FIFO's may be incorporated into the data link circuitry and the data transfers may be operated slightly asynchronously. However, this technique is substantially more complicated and is not recommended.

When the fault in a printing module has been corrected, the operator presses a go button 597 which returns the module to service. When this occurs, the repaired module sends a signal to the downstream printing module. Data is then received via the downstream data link and stored in the bi-level page memories.

When a signal is received from an upstream printing module indicating that an upstream module has been restored to operation, this signal is passed on to downstream printing modules. Data from the downstream printing module will be received by the high speed data interface 590 via the downstream data link 599. This data is stored in the bi-level page memory. Prior to storing received data in a memory location, the data at that location is read and sent to the upstream printing module via the high speed data interface 590 and upstream data link 599.

As all printing modules downstream from (and including) the faulty printing module transfer data simultaneously, all of the data transfers required for the entire printing line can be completed in one second.

Figure 14:
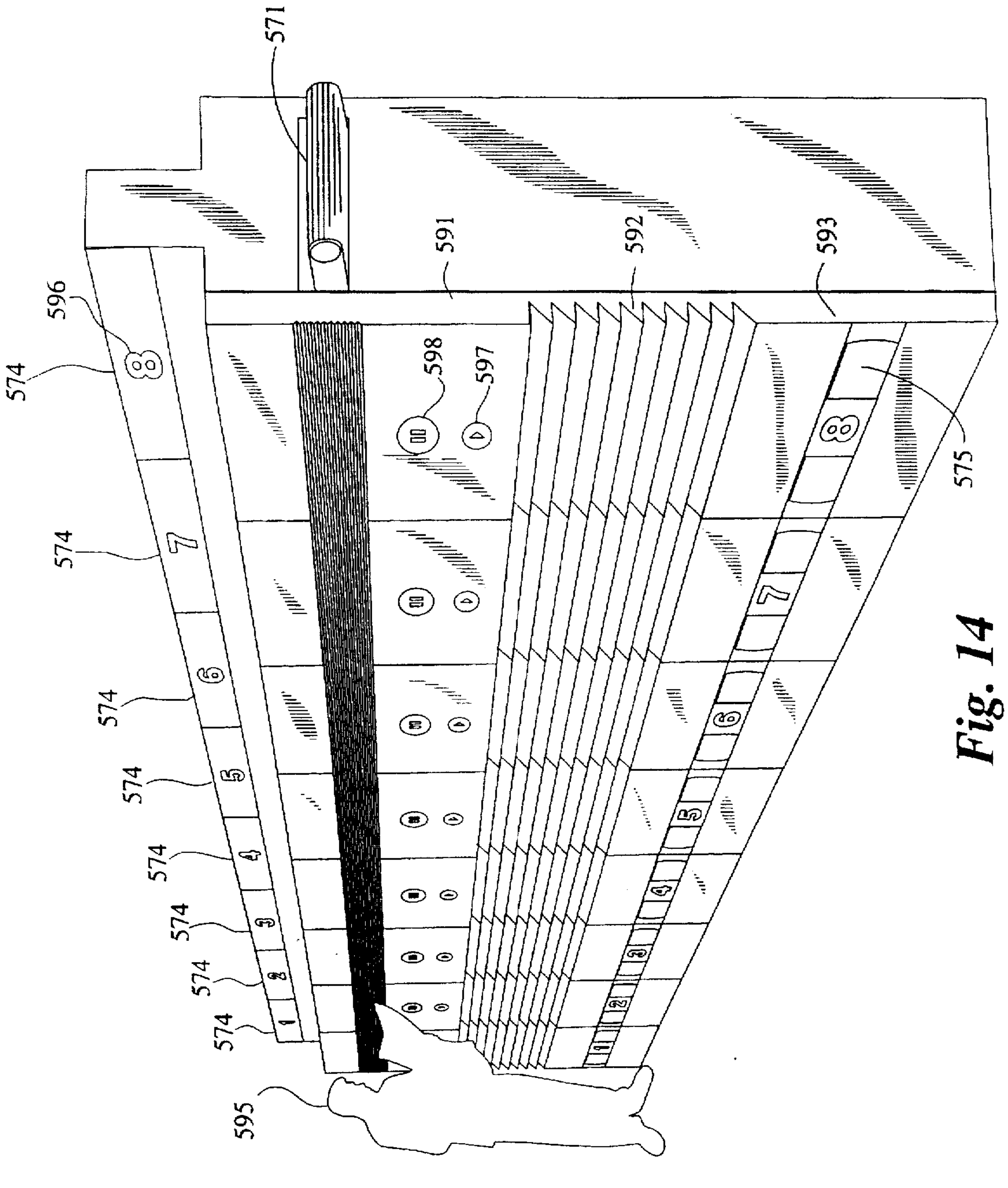
FIG. 14 is an external view showing the approximate size of a line of eight digital color printing modules.

FIG. 14 is a perspective drawing of a row of eight modular digital printing presses 574.

The pause button 598 and go button 597 should be large and conveniently positioned so that a human operator can quickly access them. An indicator light 596 shows when a particular module requires human attention. This light is positioned on top of the printing module 574 so that it is visible from a distance, even when there are many rows of printing modules.

The door to the printing module 574 can be in three sections which can be independently opened. The lowest door section 593 allows access to the paper roll 575. If the printing module 574 includes an automatic paper feeding system, then this door may be the only required access when changing paper rolls. The middle door section 592 allows access to the paper path and print heads. This door is ventilated and includes the paper drying fans. For operator convenience, the airflow should be from the front of the machine to the back. The top door section 591 provides access to the electronics, conveyor belt, and ink reservoirs.

Printed documents exit the system via the conveyor belt 571. This conveyor belt can feed the documents directly into a binding machine.

A human outline 595 shows the approximate scale of the system.

The foregoing describes one embodiment of the present invention. Modifications, obvious to those skilled in the art, can be made thereto without departing from the scope of the invention.

APPENDIX A

LIFT head type A4-6-800

This is a six color print head for A4 size printing. The print head is fixed, and is the full width of the A4 paper. Resolution is 800 dpi bi-level for high quality color output.

| | | Derivation |
|---|---|---|
| Basic specifications | | |
| Resolution | 800 dpi | Specification |
| Print head length | 215 mm | Width of print area, plus 5 mm |
| Printhead width | 8 mm | Derived from physical and layout constraints of head |
| Ink colors | 6 | CC'MM'YK |
| Page size | A4 | Specification |
| Print area width | 210 mm | Pixels per line / Resolution |
| Print area length | 297 mm | Total length of active printing |
| Page printing time | 1.3 seconds | Derived from scans, lines per page and dot printing rate |
| Pages per minute | 37 ppm | 60/(120% of print time in seconds) |
| Basic IC process | 1.5 μm CMOS | Recommendation |
| Bitmap memory requirement | 44.3 MBytes | Bitmap memory required for one scan (cannot pause) |
| Pixel spacing | 31.8 μm | Reciprocal of resolution |
| Pixels per line | 6,624 | Active nozzles / Number of colors |
| Lines per page | 9,354 | Scan distance * resolution |
| Pixels per page | 61,960,896 | Pixels per line * lines per page |
| Drops per page | 247,843,584 | Pixels per page * simultaneous ink colors |
| Average data rate | 32.9 MBytes/sec | Pixels per second * ink colors / 8 MBits |
| Ejection energy per drop | 977 nj | Energy applied to heater infinite element simulations |
| Energy to print full black page | 242 J | Drop ejection energy * drops per page |
| Recording medium speed | 22.0 cm/sec | 1/(resolution * actuation period times phases) |
| Yield and cost | | |
| Number of chips per head | 1 | Recommendation |

APPENDIX A-continued

LIFT head type A4-6-800
This is a six color print head for A4 size printing. The print head is fixed, and is the full width of the A4 paper. Resolution is 800 dpi bi-level for high quality color output.

| | | Derivation |
|---|---|---|
| Wafer size | 300 mm (12") | Recommendation |
| Chips per wafer | 22 | From chip size and recommended wafer size |
| Print head chip area | 17.2 $cm^2$ | Chip width * length |
| Yield without fault tolerance | 0.34% | Using Murphy's method, defect density = 1 per $cm^2$ |
| Yield with fault tolerance | 89% | See fault tolerant yield calculations ($D=1/cm^2$, CF=2) |
| Functional print heads per month | 195,998 | Assuming 10,000 wafer starts per month |
| Print head assembly cost | $10 | Estimate |
| Factory overhead per print head | $17 | Based on $120 m. cost for re-refurbished 1.5 µm Fab line amortised over 5 years, plus $16 m. P.A. operating cost |
| Wafer cost per print head | $31 | Based on materials cost of $600 per wafer |
| Approx. total print head cost | $58 | Sum of print head assembly, overhead, and wafer costs |
| **Nozzle and actuation specifications** | | |
| Nozzle radius | 10 µm | Specifcation |
| Number of actuation phases | 8 | Specification |
| Nozzles per phase | 4,968 | From page width, resolution and colors |
| Active nozzles per head | 39,744 | Actuation phases * nozzles per phase |
| Redundant nozzles per head | 39,744 | Same as active nozzles for 100% redundancy |
| Total nozzles per head | 79,488 | Active plus redundant nozzles |
| Drop rate per nozzle | 6,944 Hz | 1/(heater active period * number of phases) |
| Heater radius | 10.5 µm | From nozzle geometry and radius |
| Heater thin film resistivity | 2.3 µΩm | For heater formed from TaAl |
| Heater resistance | 1,517 Ω | From heater dimensions and resistivity |
| Average heater pulse current | 6.0 mA | From heater power and resistance |
| Heater active period | 18 µs | From finite element simulations |
| Settling time petween pulses | 126 µs | Active period * (actuation phases-1) |
| Clock pulses per line | 5,678 | Assuming multiple clocks and no transfer register |
| Clock frequency | 39.4 MHz | From clock pulses per line, and lines per second |
| Drive transistor on resistance | 56 Ω | From re-commended device geometry |
| Average head drive voltage | 9.4 V | Heater current * (heater + drive transistor resistance) |
| Drop selection temperature | 50° C. | Temperature at which critical surface tension is reached |
| Heater peak temperature | 120° C. | From finite element simulations |
| **Ink specifications** | | |
| Basic ink carrier | Water | Specification |
| Surfactant | 1-Hexadecanol | Suggested method of achieving temperature threshold |
| Ink drop volume | 9 pl | From finite element simulations |
| Ink density | 1.030 $g/cm^3$ | Black ink density at 60° C. |
| Ink drop mass | 9.3 ng | Ink drop volume * ink density |
| Ink specific heat capacity | 4.2 J/Kg/°C. | Ink carrier characteristic |
| Max. energy for self cooling | 1,164 nJ/drop | Ink drop heat capacity * temperature increase |
| Total ink per color per page | 0.56 ml | Drops per page per color * drop volume |
| Maximum ink flow rate per color | 0.41 ml/sec | Ink per color per page / page print time |
| Full black ink coverage | 35.7 $ml/m^2$ | Ink drop volume * colors * drops per square meter |
| Ejection ink surface tension | 38.5 mN/m | Surface tension required for ejection |
| Ink pressure | 7.7 kPa | 2 * Ejection ink surface tension / nozzle radius |
| Ink column height | 763 mm | Ink column height to achieve ink pressure |

I claim:

1. A digital printing system comprising a plurality of digital printer modules, each including:

(a) means for supporting and feeding a print medium from a supply station through a print path and from a print path outlet;

(b) means for printing upon said medium during its movement through said print path; and (c) sheet conveyor means for transporting sheets from said print path outlet along a module transport segment to a module egress, said modules being interconnected in a serial array wherein the module egress of upstream modules are coupled to the print sheet outlet region of the adjacent downstream modules so that a stack of print sheets builds up upon the coupled conveyor means as the stack passes along the transport segments, from the first module to the last module.

2. The invention defined in claim 1 wherein each module comprises a lower section housing the present medium supply, an intermediate section housing said printing means, and an upper section housing said conveyor means.

3. The invention defined in claim 2 wherein said paper supply means includes means for supporting a roll of continuous web material on a removable frame; and said modules each further include means for cutting such medium into sheets prior to exiting the print path.

4. The printing system defined in claim 1 further comprising a plurality of digital page memories each respectively associated with a respective printer module and control means for loading such page memories with page data and synchronizing the digital printing of successive print pages in each module with the feed of sheets by said conveyor means.

5. The printing system defined in claim 1 wherein each printing module comprises at least first and second printing heads spaced along said path for respectively printing on first and second sides of the print medium.

6. The invention defined in claim 5 wherein said module print paths are configured so each printing head prints downwardly and print media is manipulated during feed to achieve side reversal.

7. A digital color printing press characterized by substantially identical printing modules being adapted to be cascaded to achieve a higher total printing rate and a removable frame for supporting a roll of continuous web material, wherein said removable frame includes wheels mounted on the underside thereof.

8. A digital color printing press using liquid ink, said printing press including a plurality of substantially identical printing modules cascaded to achieve a higher total printing rate, each module having an associated paper transport module and comprising:

(a) a plurality of drop-emitter nozzles;

(b) a body of ink associated with said nozzles;

(c) a pressurizing device adapted to subject ink in said body of ink to a pressure of at least 2% above ambient pressure, at least during drop selection and separation to form a meniscus with an air/ink interface;

(d) drop selection apparatus operable upon the air/ink interface to select predetermined nozzles and to generate a difference in meniscus position between ink in selected and non-selected nozzles; and (e) drop separation apparatus adapted to cause ink from selected nozzles to separate as drops from the body of ink, while allowing ink to be retained in non-selected nozzles.

9. A digital color printing press comprising:

(a) means for connecting to a raster image processing computer to receive data for producing a plurality of digitally halftoned binary page images;

(b) a plurality of digital page memories for storing such binary page images;

(c) a plurality of liquid ink printing heads;

(d) a paper transport system which moves a marking medium past said printing heads as the page image is being printed; and (e) an ink reservoir and ink pressure regulation system which maintains ink flow to said heads where the printing heads are fixed at the same height.

10. A digital color printing press as claimed in claim 9 where a single ink reservoir for each of a plurality of colors is adapted to supply all of the printing heads.

11. A digital printing system comprising a plurality of digital printer modules, each including:

(a) apparatus adapted to support and feed a print medium from a supply station through a print path and from a print path outlet;

(b) a printer unit adapted to print upon said medium during its movement through said print path; and (c) a sheet conveyor adapted to transport sheets from said print path outlet along a module transport segment to a module egress, said modules being interconnected in a serial array wherein the module egress of upstream modules are coupled to the print sheet outlet region of the adjacent downstream modules so that a stack of print sheets builds up upon the coupled conveyor as the stack passes along the transport segments, from the first module to the last module.

12. The invention defined in claim 11 wherein each module comprises a lower section housing the present medium supply, an intermediate section housing said printer unit, and an upper section housing said conveyor means.

13. The invention defined in claim 12 wherein:

said apparatus includes a support for a roll of continuous web material on a removable frame; and said modules each further include means for cutting such medium into sheets prior to exiting the print path.

14. The printing system defined in claim 11 further comprising:

a plurality of digital page memories each respectively associated with a respective printer module; and control means for loading such page memories with page data and synchronizing the digital printing of successive print pages in each module with the feed of sheets by said conveyor.

15. The printing system defined in claim 11 wherein each printing module comprises at least first and second printing heads spaced along said path for respectively printing on first and second sides of the print medium.

16. The invention defined in claim 15 wherein said module print paths are configured so each printing head prints downwardly and print media is manipulated during feed to achieve side reversal.

* * * * *